(12) United States Patent
Kimura et al.

(10) Patent No.: US 6,374,218 B2
(45) Date of Patent: *Apr. 16, 2002

(54) SPEECH RECOGNITION SYSTEM WHICH DISPLAYS A SUBJECT FOR RECOGNIZING AN INPUTTED VOICE

(75) Inventors: Shinta Kimura; Yasuo Satoh, both of Kawasaki; Tomio Koide, Tachikawa, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/026,612

(22) Filed: Feb. 20, 1998

(30) Foreign Application Priority Data

Aug. 8, 1997 (JP) .............................. 9-215308

(51) Int. Cl.⁷ .............................. G10L 15/04
(52) U.S. Cl. .................. 704/251; 704/270; 704/275; 704/231; 704/260; 707/500; 707/531
(58) Field of Search ................. 704/251, 231, 704/270, 260, 225, 200; 707/500, 531

(56) References Cited

U.S. PATENT DOCUMENTS

| | | | | |
|---|---|---|---|---|
| 4,394,538 A | * | 7/1983 | Warren | 704/200 |
| 4,461,023 A | * | 7/1984 | Katayama | 704/251 |
| 4,489,435 A | * | 12/1984 | Moshier | 704/251 |
| 4,720,802 A | * | 1/1988 | Damoulakis et al. | 364/513.5 |
| 4,866,778 A | * | 9/1989 | Baker | 704/231 |
| 4,914,704 A | * | 4/1990 | Cole et al. | 704/260 |
| 4,962,535 A | * | 10/1990 | Kimura et al. | 704/251 |
| 5,007,081 A | * | 4/1991 | Schmuckel et al. | 379/354 |
| 5,027,406 A | * | 6/1991 | Roberts et al. | 704/260 |
| 5,329,609 A | * | 7/1994 | Sanada et al. | 704/251 |
| 5,386,494 A | * | 1/1995 | White | 704/275 |
| 5,754,972 A | * | 5/1998 | Baker et al. | 704/200 |
| 5,758,319 A | * | 5/1998 | Knittle | 704/251 |
| 5,774,841 A | * | 6/1998 | Salazar et al. | 704/225 |
| 5,799,274 A | * | 8/1998 | Kuroda | 704/239 |
| 5,799,325 A | * | 8/1998 | Rivette et al. | 707/500 |
| 5,845,301 A | * | 12/1998 | Rivette et al. | 707/512 |
| 5,890,122 A | * | 3/1999 | Van Kleeck et al. | 704/275 |

FOREIGN PATENT DOCUMENTS

| | | |
|---|---|---|
| JP | 59-131828 | 7/1984 |
| JP | 5-181496 | 7/1993 |

* cited by examiner

*Primary Examiner*—Vijay B Chawan
(74) *Attorney, Agent, or Firm*—Staas & Halsey, LLP

(57) ABSTRACT

A speech recognition system wherein a word being the most similar to an inputted voice is delivered as a recognized result; in order to assist a user in entering a voice input, words being subjects for the recognition of the inputted voice are automatically displayed, or recently displayed ones of words which have been displayed up to the present are extracted as words to become subjects for recognition and are automatically displayed as the subjects for the recognition of the input voice.

24 Claims, 25 Drawing Sheets

SPEECH RECOGNITION SYSTEM WHICH DISPLAYS A SUBJECT FOR RECOGNIZING AN INPUTTED VOICE

BACKGROUND OF THE INVENTION

1. Field of the Invention

The present invention relates to speech recognition systems. More particularly, it relates to such a recognitive-word displaying method in a speech recognition system that words being subjects for speech recognition are automatically displayed on a display screen, thereby to assist the user of the system in inputting a voice.

2. Description of the Related Art

FIG. 1 is a block diagram showing the architecture of a prior-art example of a speech recognition system. In the speech recognition system, a microphone 1 receives a voice input and converts it into an electric signal. An analyzer 2 analyzes the inputted voice by the use of, for example, the fast Fourier transform, the linear prediction coefficient analysis, or the like. A feature extractor 3 extracts a feature from the analyzed result of the voice. A word lexicon 4 stores therein reference words which are subjects for speech recognition. A word collator 5 collates the input voice with all the words stored in the word lexicon 4, on the basis of the feature extracted by the feature extractor 3, and it obtains the word which is the most similar to the input voice. A display device 6 displays the recognized result of the word delivered from the word collator 5 and the words stored in the word lexicon 4. Herein, when the display device 6 is to display the words stored in the word lexicon 4, it cannot simultaneously display all the words on a single screen because number of the stored words is large. Therefore, a scroll controller 7 scrolls the words to-be-displayed. A mouse 8 serves to give the scroll controller 7 the command of scrolling the words.

In the word collator 5, the input voice is collated with all the words stored in the word lexicon 4. A technique for the collation is, for example, the DP (Dynamic Programming) matching which is a method for absorbing the lengthening and shortening of the input voice in the temporal direction thereof, or the HMM (Hidden Markov Model) method which utilizes the probability models of word voices. The recognized result, which is the result of the collation, is displayed on the display device 6 as stated above.

The speech recognition system toward which the present invention is directed, is premised on the situation that the user of this speech recognition system does not always know well the reference words being the subjects for recognition. In a case where the speech recognition system is used for inputting, for example, commands, the user does not know the commands well. He/she is therefore permitted to input a specified command in such a way that, while watching commands displayed on the display device 6, he/she enters the specified command as a voice input when the command to be inputted has been displayed.

In the example illustrated in FIG. 1, the user needs to enter a voice input by searching for a command to-be-inputted while scrolling the recognitive subject or reference words, for example, commands indicated on the display screen, by the use of the mouse 8. In this manner, in the prior-art example, the word to be inputted is searched for with the mouse 8, so that when the user has found the particular word on the display screen, he/she can input the specified word, for example, command by clicking this word with the mouse 8. This poses the problem that the necessity of employing the speech recognition is originally questionable.

SUMMARY OF THE INVENTION

An object of the present invention is to provide a speech recognition system in which words being subjects for speech recognition are automatically and successively indicated on, for example, a display screen, whereby a word to be entered as a voice input can be readily searched for.

Another object of the present invention is to provide a speech recognition system in which words displayed recently or latest are preferentially indicated, whereby a search time period to find a word to be entered as a voice input can be shortened.

A speech recognition system according to the present invention comprises a recognitive-word storage unit, a speech recognition unit, a display unit, a word storage unit, and a display-word extraction unit.

In the first aspect of the present invention, the recognitive-word storage unit stores therein reference words which are subjects for the recognition of an input voice. The speech recognition unit obtains a word which is the most similar to the inputted voice from among all the recognitive subject words (namely, the reference words being the subjects for recognition) stored in the recognitive-word storage unit, on the basis of the feature of the inputted voice, and it delivers the most similar word as a recognized result. The display unit automatically displays the words stored in the recognitive-word storage unit, in order to assist the user of the speech recognition system in inputting a voice.

In the second aspect of the present invention, the recognitive-word storage unit stores therein reference words which are subjects for the recognition of a current input voice. The speech recognition unit obtains a word which is the most similar to the inputted voice from among all the recognitive subject words stored in the recognitive-word storage unit, on the basis of the feature of the inputted voice, and it delivers the most similar word as a recognized result. The word storage unit stores therein words which may possibly become subjects for the recognition of input voices. The display unit automatically displays the words stored in the word storage unit, in order to assist the user of the speech recognition system in inputting a voice. The display-word extraction unit extracts recently displayed ones of words which have been displayed up to the present by the display unit, as words to become subjects for recognition, and it stores the extracted words in the recognitive-word storage unit.

DESCRIPTION OF THE PREFERRED EMBODIMENTS

Now, the aspects of performance of the present invention will be described in detail with reference to the drawings.

Figure 2A:
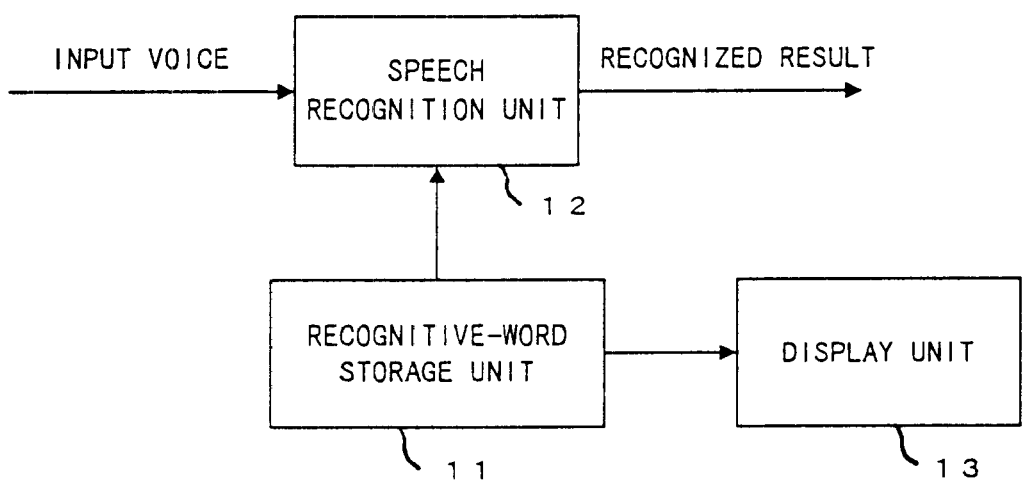
FIG. 2A is a block diagram showing the first fundamental construction of the present invention.
Figure 2B:
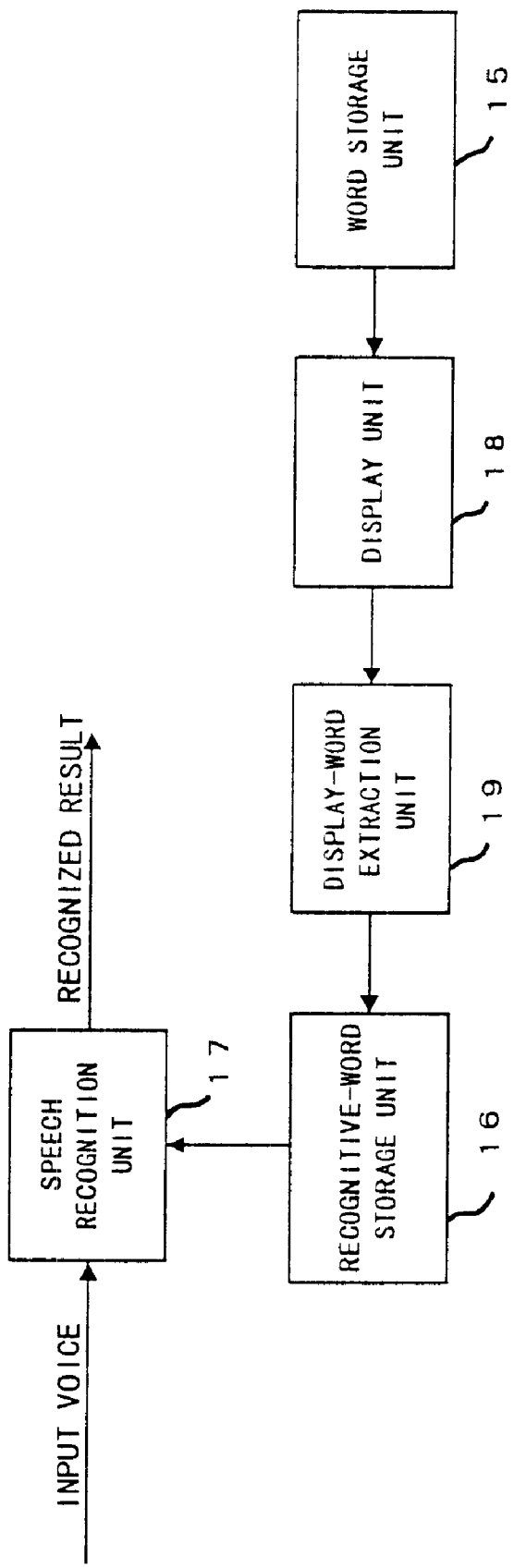
FIG. 2B is a block diagram showing the second fundamental construction of the present invention.

FIGS. 2A and 2B are block diagrams showing the fundamental constructions of the present invention, respectively. Each of these figures illustrates the fundamental construction of a speech recognition system which recognizes an inputted voice, more specifically a speech recognition system in which reference words being subjects for recognition are displayed on a display screen.

In a speech recognition system toward which the present invention is directed, words stored in a word lexicon 4, as reference words or subjects for speech recognition, are displayed simultaneously with a recognized result by a display device 6.

The speech recognition system toward which the present invention is directed, is premised on the situation that the user of this speech recognition system does not always know well the reference words being the subjects for recognition. In a case where the speech recognition system is used for inputting, for example, commands, the user does not know the commands well. He/she is therefore permitted to input a specified command in such a way that, while watching commands displayed on the display device 6, he/she enters the specified command as a voice input when the command to be inputted has been displayed. For this purpose, the speech recognition system assists the user to enter the command input, by the operation that all the commands stored in the word lexicon 4 are displayed on a display screen while being scrolled by a scroll controller 7.

FIG. 2A is a block diagram showing the first fundamental construction of the present invention. Referring to the figure, a recognitive-word storage unit 11 stores therein all of reference words, for example, commands which are subjects for the recognition of an input voice. A speech recognition unit 12 obtains a word which is the most similar to the inputted voice from among all the recognitive subject words, for example, the commands stored in the recognitive-word storage unit 11, on the basis of the feature of the inputted voice, and it delivers the most similar word as a recognized result. Further, a display unit 13 automatically displays the words stored in the recognitive-word storage unit 11, in order to assist the user of the speech recognition system in inputting a voice.

In the first fundamental construction of the present invention, the reference words being the subjects for recognition are automatically displayed on, for example, a display screen by the display unit 13. The user enters a specified word as the voice input when the word to be inputted by him/her has been found among the displayed words. The inputted voice is collated with all the recognitive subject words stored in the recognitive-word storage unit 11, on the basis of the feature thereof, and the word which is the most similar to the inputted voice is outputted as the recognized result from the speech recognition unit 12.

Here in the first fundamental construction, various methods are employed for the operation of the display unit 13 for automatically displaying the words. By way of example, all the words stored in the recognitive-word storage unit 11 can be displayed through automatic scrolling or through automatic repagination. Alternatively, they can be displayed by being read out successively in units of at least one word or by being read out on the basis of the values of random numbers which correspond to numbers assigned to the words. Thus, the user's mouse operation is dispensed with.

As described above, according to the present invention, a user can input a word in such a way that the word to be inputted by him/her is found from among words which are recognitive subject words (namely, subjects for speech recognition) and which are automatically displayed on a display screen, so that the user's operation with a mouse is dispensed with to enhance the operability of a speech recognition system.

FIG. 2B is a block diagram showing the second fundamental construction of the present invention. Referring to the figure, a word storage unit 15 stores therein all words which may possibly become subjects for the recognition of input voices. A recognitive-word storage unit 16 stores therein reference words which are subjects for the recognition of an input voice currently entered. A speech recognition unit 17 obtains a word which is the most similar to the inputted voice from among all the recognitive subject words stored in the recognitive-word storage unit 16, on the basis of the feature of the inputted voice, and it delivers the most similar word as a recognized result.

A display unit 18 serves to assist the user of the speech recognition system in inputting a voice, and it automatically displays the words which are stored in the word storage unit 15, that is, the words which may possibly become the subjects for recognition. A display-word extraction unit 19 extracts recently displayed ones of words which have been displayed up to the present by the display unit 18, as words to become subjects for recognition, and it stores the extracted words in the recognitive-word storage unit 16.

In the second fundamental construction of the present invention, in the same manner as in the first fundamental construction, all the words stored in the word storage unit 15 are automatically displayed on a display screen by, for example, a scroll control, a repagination control, or a control based on successive readout in units of at least one word. Among the words displayed by the display unit 18, the words displayed recently or latest are extracted by the display-word extraction unit 19 and are stored in the recognitive-word storage unit 16 so as to be used as the words which are the subjects for the recognition of the current input voice. The input voice is collated with the words stored in the recognitive-word storage unit 16, and the word being the most similar to the input voice is outputted as the recognized result by the speech recognition unit 17. Thus, in the second fundamental construction, the subjects for recognition are confined to the recently displayed words. In a case where words to be inputted by the user are of a comparatively small number of sorts and where they often agree with words displayed recently, the performance of speech recognition can be enhanced by limiting the number of subjects for recognition as explained above.

In a case where only words recently displayed are employed as recognitive subject words, the speed of the recognition can be increased, and the errors of the recognition can be reduced, so that the present invention greatly contributes to enhancing the practicability of the speech recognition system.

Also, the present invention can be constructed by a computer-readable storage medium storing therein a program for causing a computer to execute a first procedure for obtaining a word which is the most similar to an inputted voice from among all recognitive subject words (namely, reference words being subjects for recognition) stored in a recognitive-word storage unit, on the basis of the feature of the inputted voice, so as to deliver the most similar word as a recognized result; and a second procedure for automatically displaying the words stored in the recognitive-word storage unit, in order to assist the user of the speech recognition system in entering a voice input.

Further, the present invention can be constructed by a computer-readable storage medium storing therein a program for causing a computer to execute a first procedure for obtaining a word which is the most similar to an inputted voice from among all recognitive subject words (namely, reference words being subjects for recognition) stored in a recognitive-word storage unit in which the words being the subjects for the recognition of the current input voice are stored, on the basis of the feature of the inputted voice, so as to deliver the most similar word as a recognized result; a second procedure for automatically displaying words stored in a word storage unit in which the words to possibly become subjects for the recognition of input voices are stored, in order to assist the user of the speech recognition system in entering a voice input; and a third procedure for extracting recently displayed ones of the words which have been displayed up to the present by the second procedure, as the words to become the subjects for the recognition, so as to store the extracted words in the recognitive-word storage unit.

Figure 2C:
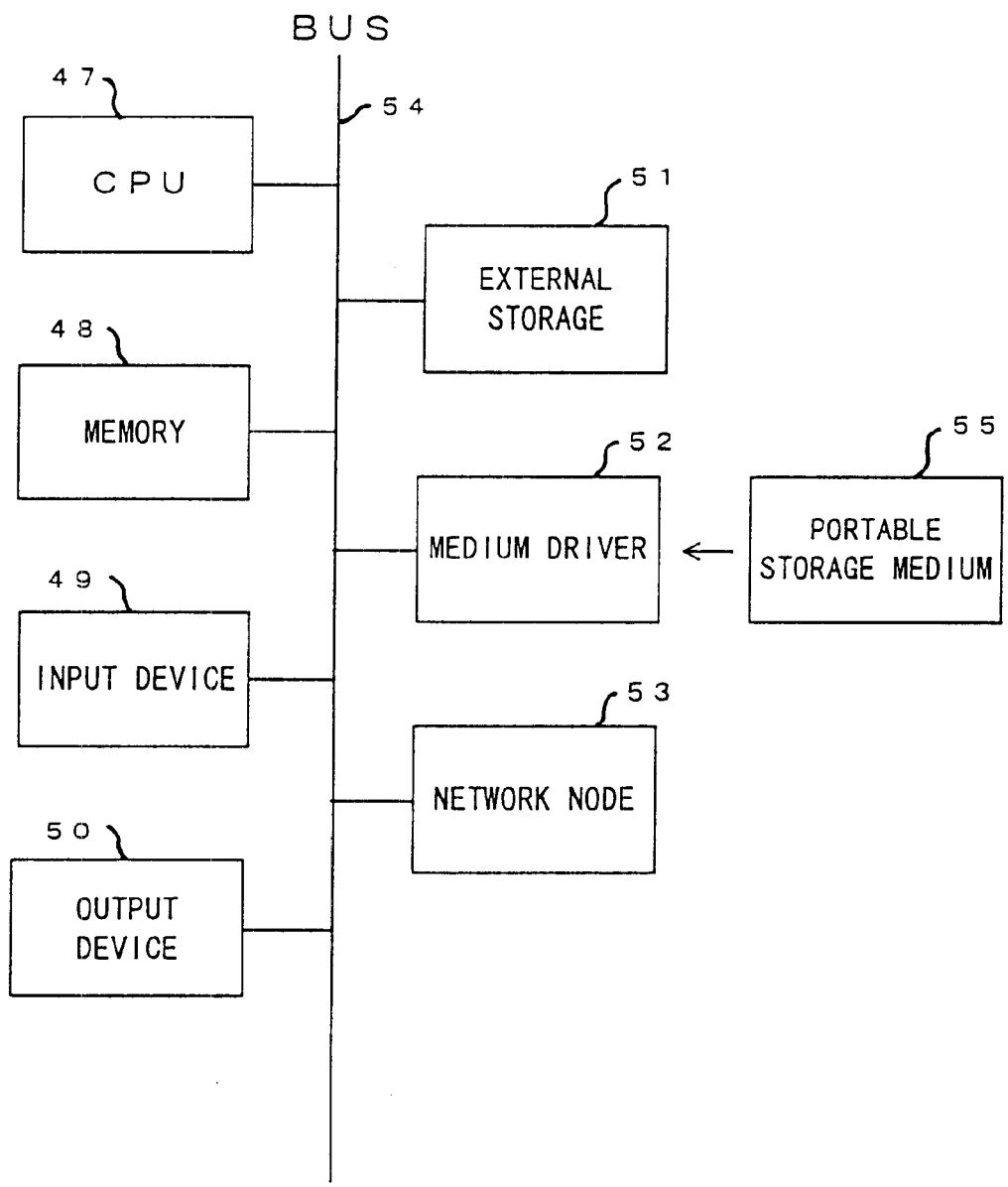
FIG. 2C is a connection diagram showing an example of an arrangement of information processing equipment.

FIG. 2C is a connection diagram showing an example of arrangement of information processing equipment which is a speech recognition system according to the present invention. The information processing equipment shown in FIG. 2C comprises a CPU (central processing unit) 47, a memory 48, an input device 49, an output device 50, an external storage 51, a medium driver 52 and a network node 53, which are all interconnected by a bus 54.

The CPU 47 runs programs stored in the memory 48, and controls the constituents of the equipment. The memory 48 is, for example, a ROM (read only memory) or a RAM (random access memory), in which the programs are stored. The input device 49 includes a keyboard, a mouse, a microphone or/and the like, to which various kinds of data are inputted. The output device 50 includes a printer, a display device, a loudspeaker or/and the like, from which various kinds of data are outputted. The external storage 51 is, for example, a hard disk device, in which programs and data can be stored in large quantities. The medium driver 52 can drive a portable storage medium 55 so as to access the stored contents thereof. The portable storage medium 55 is a memory card, a floppy disk, a CD-ROM (compact-disk read only memory), an optical disk, or the like. The network node 53 can be connected with a LAN (local area network) or the like so as to exchange data with any other information processing equipment or the like.

Figure 2D:
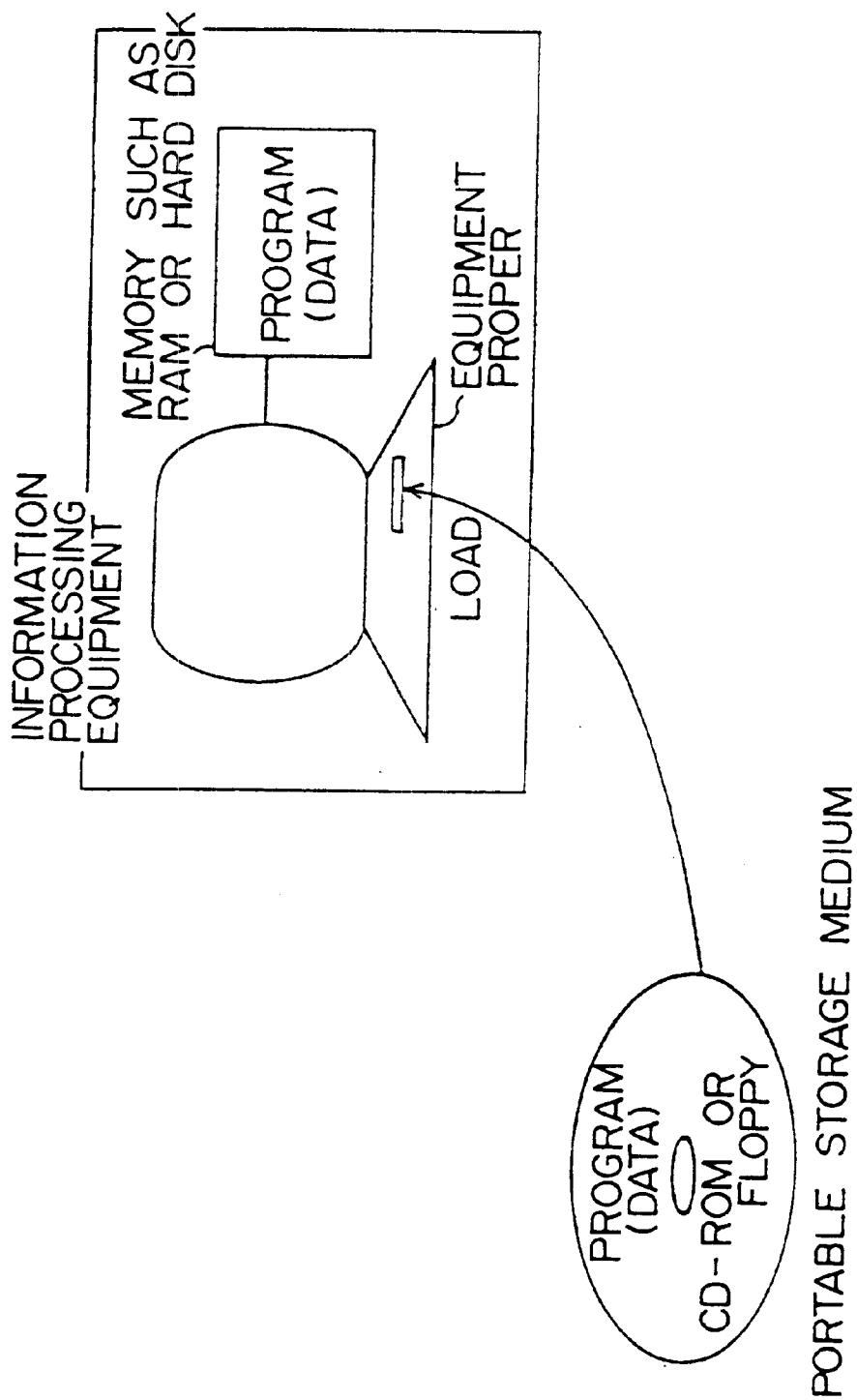
FIG. 2D is a schematic diagram for explaining information processing equipment into which a portable storage medium can be loaded.

FIG. 2D is a schematic diagram for explaining information processing equipment into which a portable storage medium can be loaded. Programs and data stored in the portable storage medium can be utilized by loading the information processing equipment with the memory card, floppy disk, CD-ROM, optical disk or the like as mentioned above.

Figure 1:
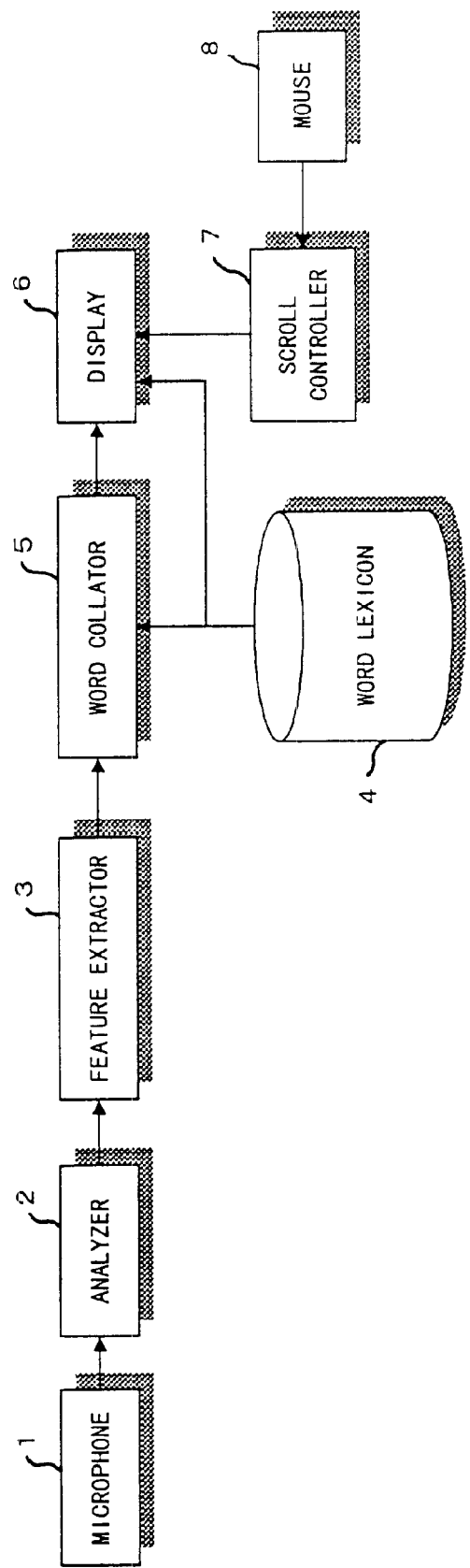
FIG. 1 is a block diagram showing the architecture of a prior-art example of a speech recognition system.
Figure 3:
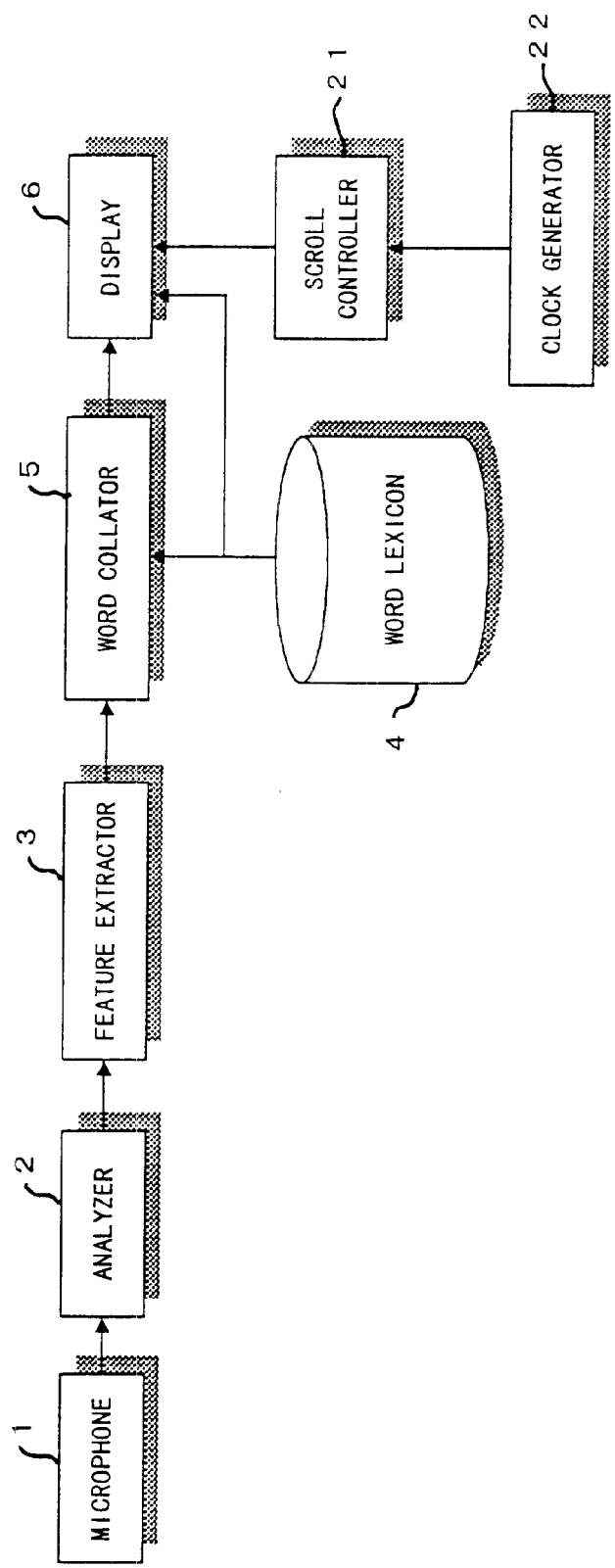
FIG. 3 is a block diagram showing an architecture in the first aspect of performance of a speech recognition system according to the present invention.

FIG. 3 is a block diagram showing an architecture in the first aspect of performance of a speech recognition system according to the present invention. In the figure, portions which perform the same operations as in the prior-art example illustrated in FIG. 1 are indicated by the same reference numerals. Portions different from those in FIG. 1 are a scroll controller 21 and a clock generator 22.

In this first aspect of performance, recognitive subject words (namely, reference words being subjects for recognition) stored in the word lexicon 4 are displayed by the display device 6, and the display is controlled by the scroll controller 21. The scroll operation is automatically executed unlike that of the prior-art system in FIG. 1. More specifically, the display is scrolled every clock pulse, for example, by a clock signal which the clock generator 22 generates. Thus, the scroll control proceeds in such a form that m words among the recognitive subject words stored in the word lexicon 4 are always displayed on the screen of the display device 6.

Figure 4:
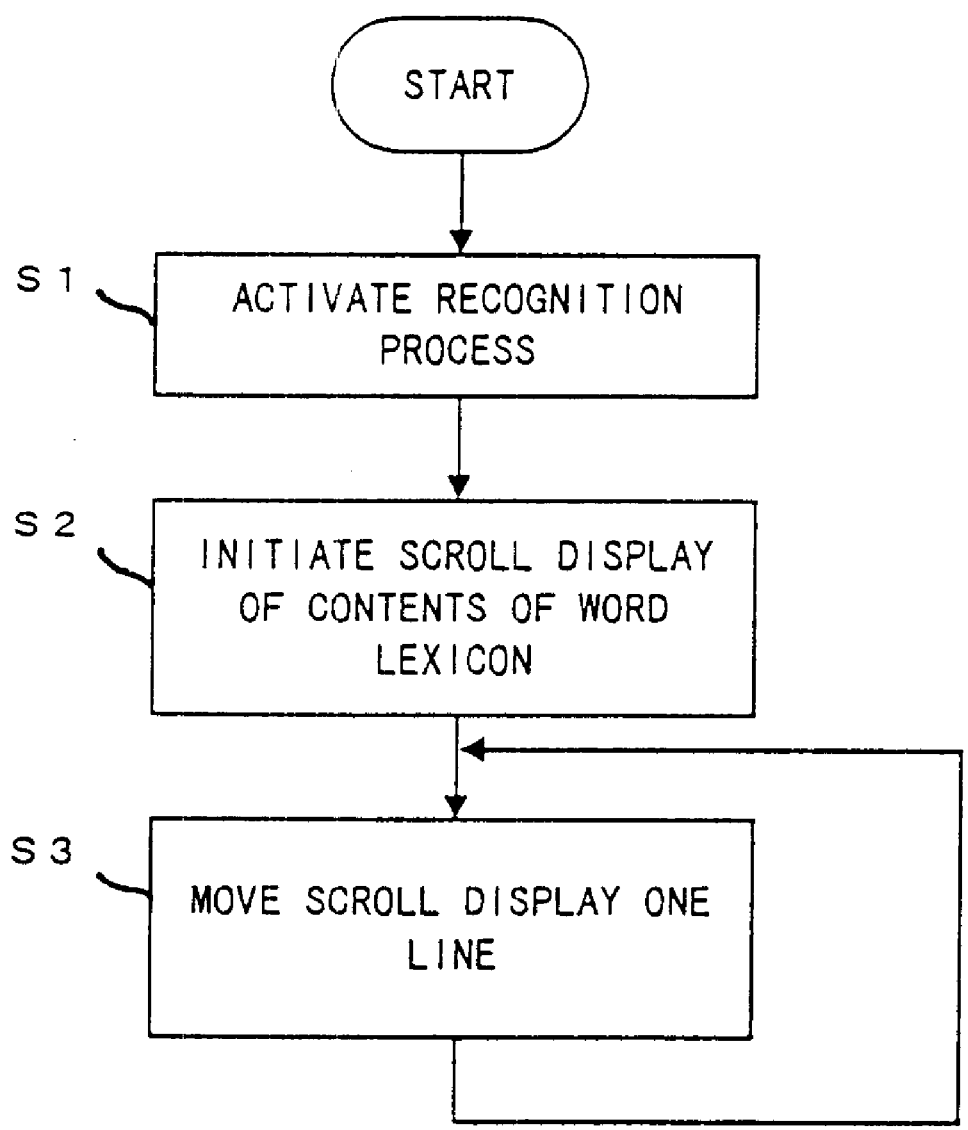
FIG. 4 is a flowchart showing a general process in the first aspect of performance.
Figure 5:
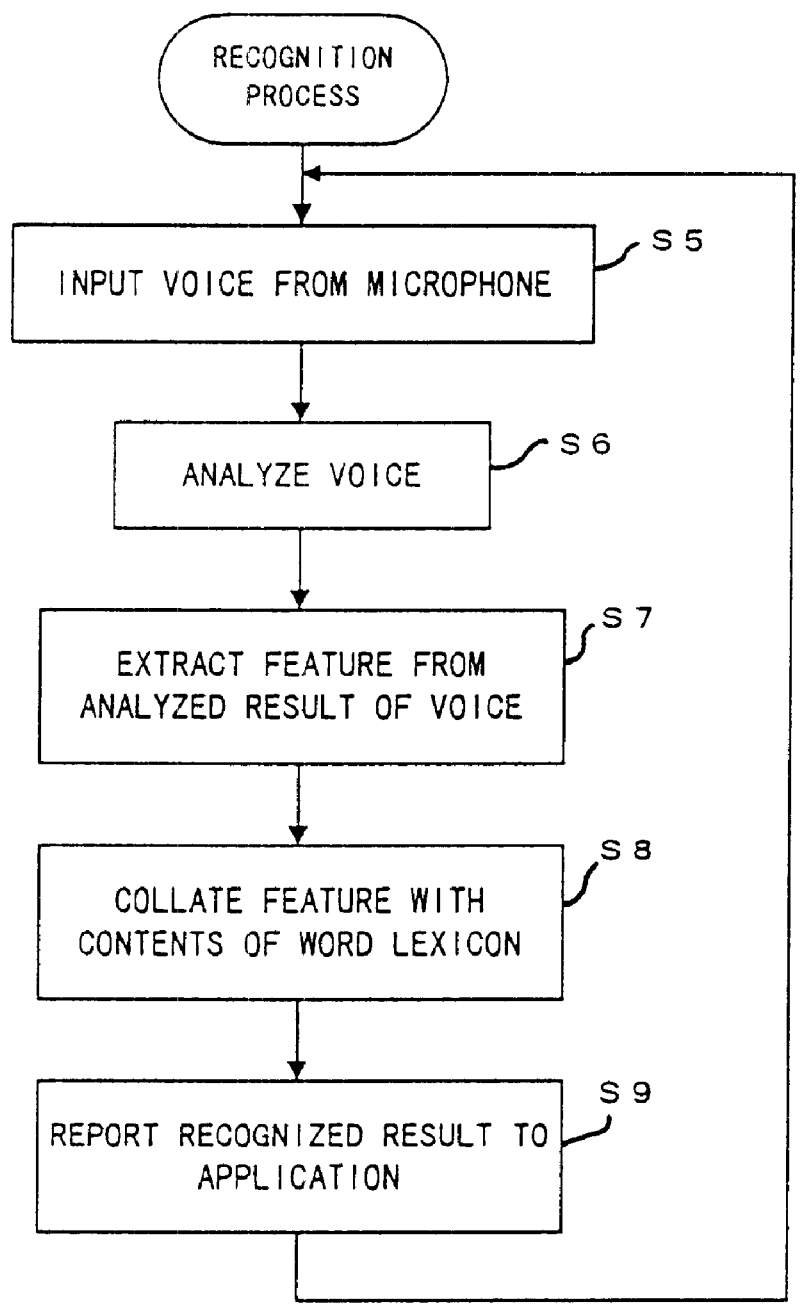
FIG. 5 is a processing flowchart showing a recognition process in the first aspect of performance.

FIG. 4 is a flowchart showing a general process in the first aspect of performance illustrated in FIG. 3, while FIG. 5 is a processing flowchart showing a recognition process indicated in FIG. 4.

Referring to FIG. 4, when the general process is started, the recognition process is activated at step S1. Thereafter, the scroll display of the contents of the word lexicon 4 is initiated at step S2. At step S3, the scroll display of the m words is moved one line, for example, on the display screen, and the one-line scroll is iterated. Herein, the number of lines to be scrolled may well be two or more. It is also allowed to adopt a contrivance in which the number of lines to be scrolled can be set as desired by the user.

In the recognition process illustrated in FIG. 5, a voice input is received from the microphone 1 at step S5.

Subsequently, the voice is analyzed by the analyzer 2 at step S6. At step S7, the feature of the input voice is extracted from the result of the analysis by the feature extractor 3. At step S8, the word collator 5 collates the feature with all the words stored in the word lexicon 4. At step S9, the result of the collation, that is, the most similar word is reported to an application as a recognized result. Thereafter, the next voice input from the microphone 1 is waited.

Figure 6A:
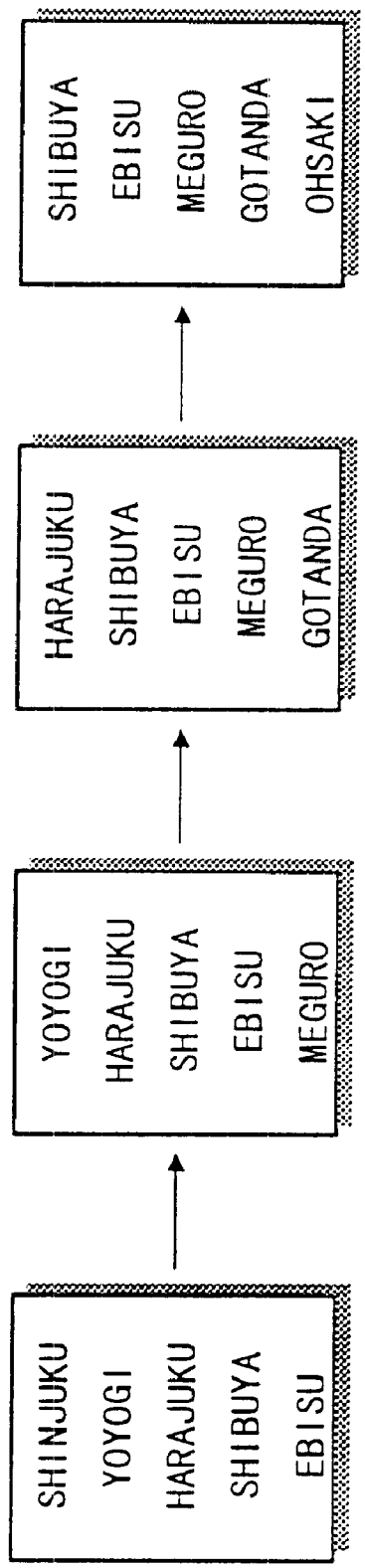
FIG. 6A is a diagram for explaining a display image composed of a plurality of words, in the first aspect of performance.
Figure 6B:
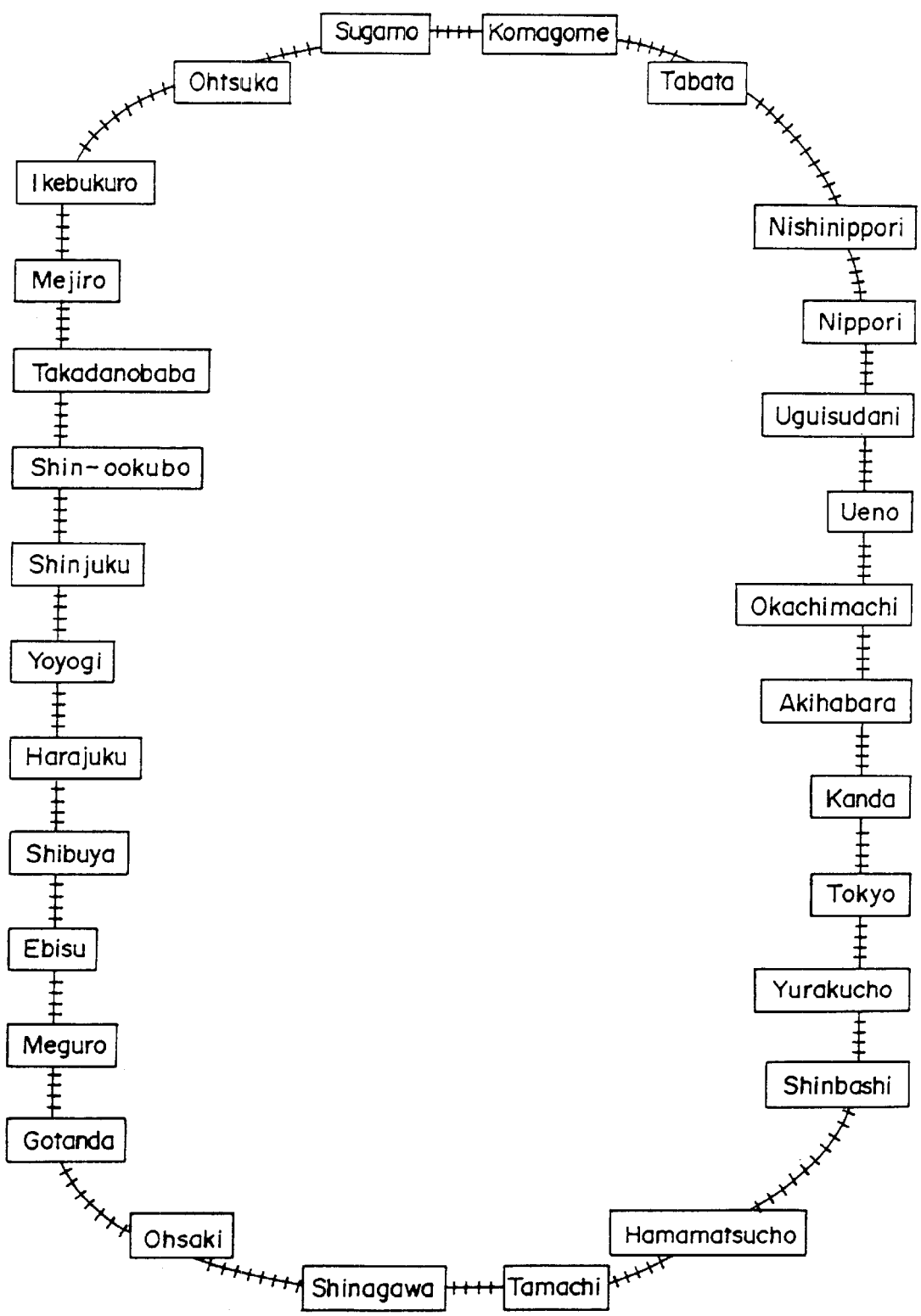
FIG. 6B is a route diagram for explaining those names of the stations of the Yamanote Loop Line which are practicable examples of words.

FIG. 6A is a diagram for explaining a display image composed of a plurality of words, in the first aspect of performance illustrated in FIG. 3, while FIG. 6B is a route diagram for explaining those names of the stations of the Yamanote Loop Line which are examples of words. In the display image shown in FIG. 6A, the names of the stations of the Yamanote Loop Line numbering five are displayed consecutively on one screen, and the display is scrolled in the form in which one station is moved up every clock pulse.

Figure 7:
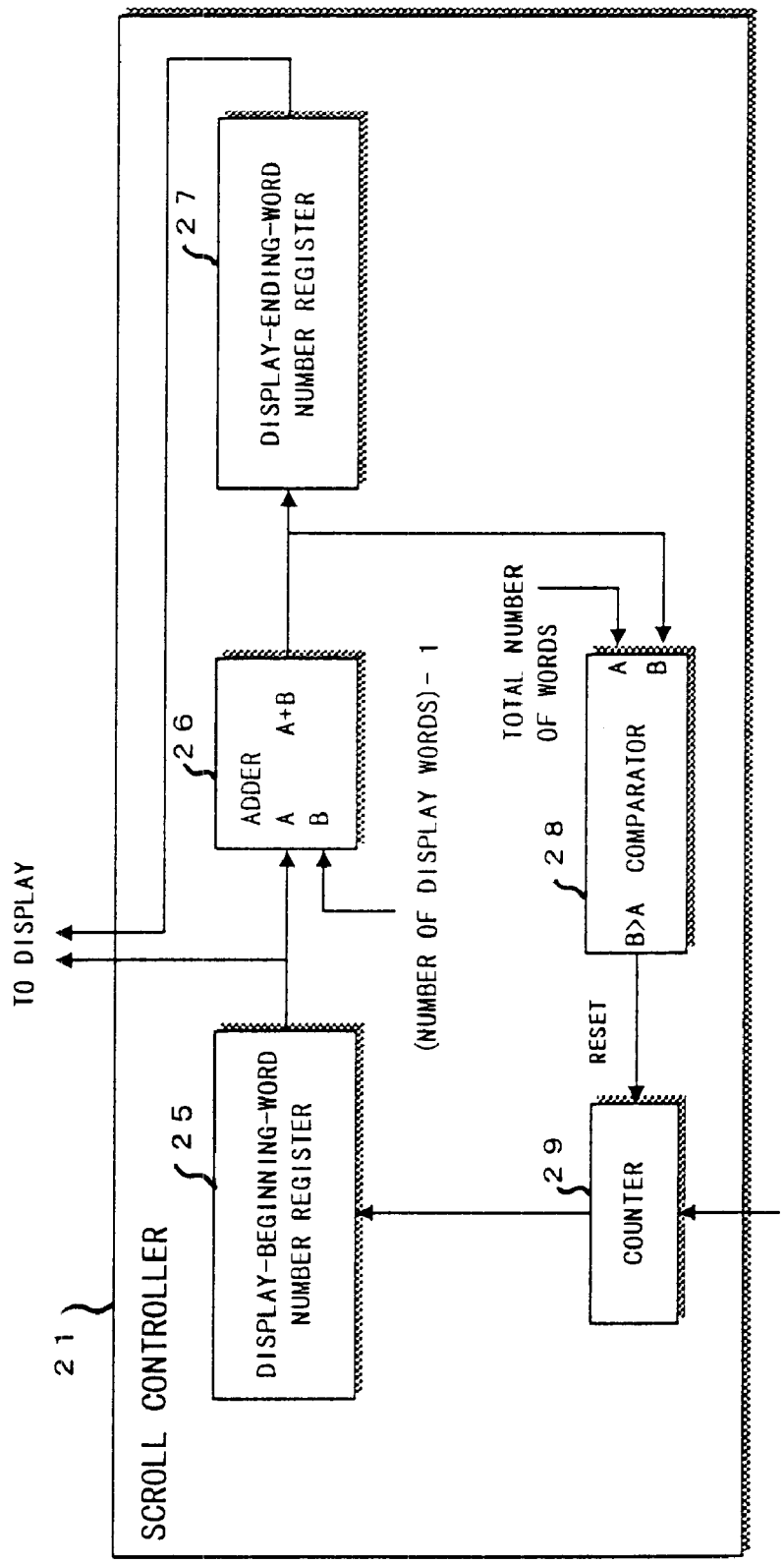
FIG. 7 is a block diagram showing the circuit arrangement of a scroll controller which is included in the system architecture of FIG. 3.

FIG. 7 is a block diagram showing the detailed circuit arrangement of the scroll controller 21 depicted in FIG. 3. Referring to FIG. 7, the scroll controller 21 includes a display-beginning-word number register 25 which stores therein the number of the word at a display-beginning-position, for example, the uppermost position on one screen. An adder 26 adds the output A of the display-beginning-word number register 25 and a value B which is obtained by subtracting 1 (one) from the number of the display words to be displayed on one screen. A display-ending-word number register 27 stores the output of the adder 26 as the number of the word at a display end position, for example, at the lowermost position on one screen. A comparator 28 compares the output B of the adder 26 with the number A of all the words stored in the word lexicon 4 shown in FIG. 3, and it resets a counter 29 when the output B has exceeded the number A. The counter 29 has its count value incremented by the clock signal of the clock generator 22 shown in FIG. 3, and it delivers the count value to the display-beginning-word number register 25. Here, when the value of the incrementation is set at 1 (one), a 1-line scroll operation is executed, and when it is set at 2, a 2-line scroll operation is executed.

Figure 8:
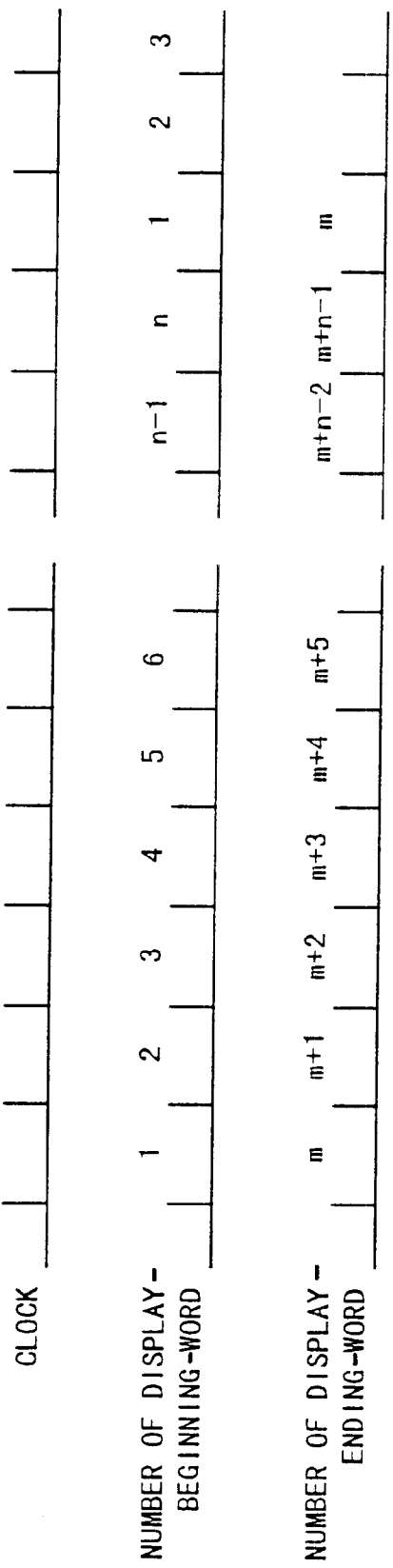
FIG. 8 is a timing chart for explaining how the number of a display-beginning-word and that of a display-ending-word as indicated in FIG. 7 are changed by a clock signal.

FIG. 8 is a timing chart for explaining the numbers of the display-beginning-word and display-ending-word as correspond to the clock signal. In the figure, it is assumed that the number of the words which are displayed on one screen be represented by "m", while the number of the words which are stored in the word lexicon 4 in FIG. 3 be represented by "n". The number of the display-beginning-word enlarges each time the clock interval of the clock signal advances, and the number of the display-ending-word becomes (n+m−1) when the nth word has come to the display-beginning-position. At the next clock interval, the number of the display-beginning-word returns to 1 (one). In this manner, the scroll control of the word display is repeated with the advance of the clock interval. Although the counter value to be incremented by the clock signal has been explained as 1 (one), it may well be 2 or more. It is also allowed to adopt a contrivance in which the incremental value can be set as desired by the user.

More specifically, the recognitive subject words as candidates one of which may possibly be given as the voice input are displayed as scrolling, so that the user can readily enter the voice input while watching the words of the candidates, without moving the line of sight considerably.

Figure 9:
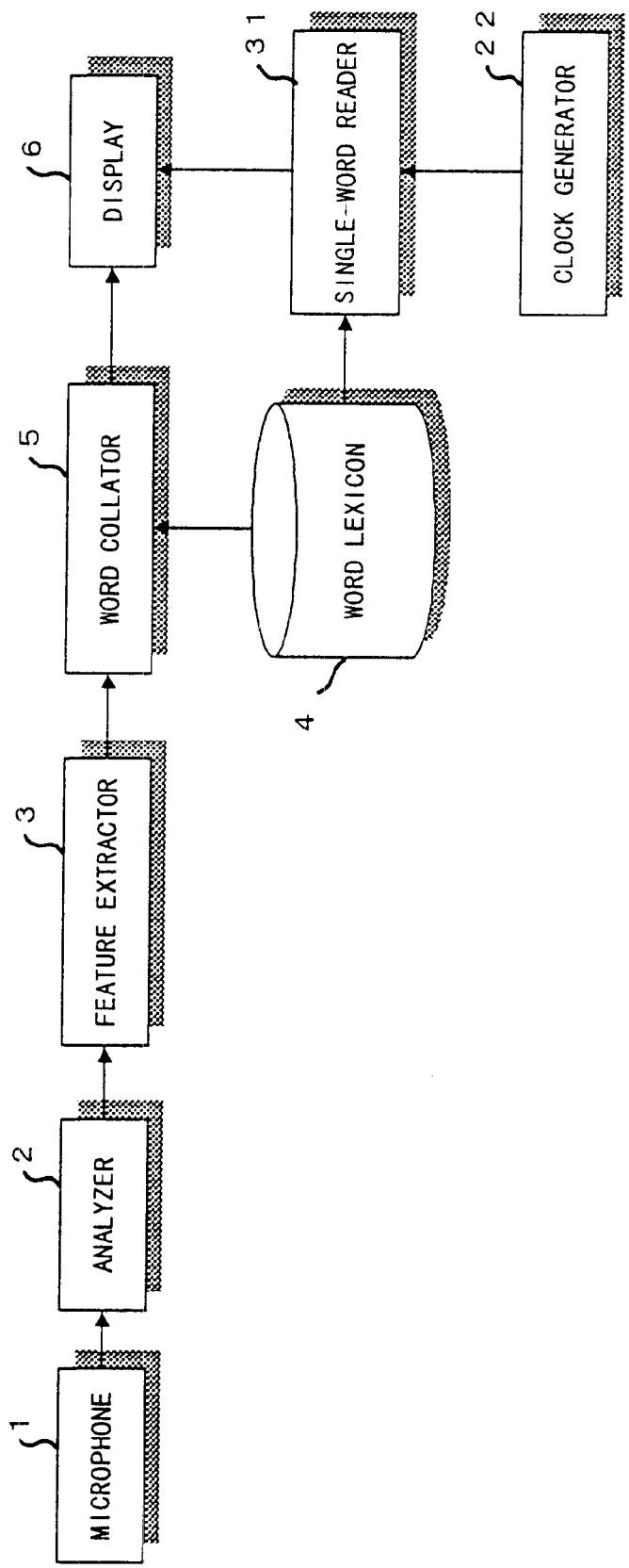
FIG. 9 is a block diagram showing an architecture in the second aspect of performance of a speech recognition system.

FIG. 9 is a block diagram showing an architecture in the second aspect of performance of a speech recognition system. As compared with the first aspect of performance illustrated in FIG. 3, the second aspect of performance illustrated in FIG. 9 differs only in the point that a single-word reader 31 is included instead of the scroll controller 21. Here in the second aspect of performance, in displaying the words which are subjects for speech recognition and which are stored in the word lexicon 4, the scroll control is not employed, but the contents of the word lexicon 4 are read out in single-word units by the single-word reader 31 and are successively displayed by the display device 6. The operation of reading out the words one by one is performed in synchronism with the clock signal which is outputted by the clock generator 22. Incidentally, although the words are read out in units of the single word here, this mode of operation is not restrictive. It is naturally possible to increase the number of words as the readout unit to, for example, two or three. Alternatively, the number of words as the readout unit can be changed in compliance with an instruction given by the user.

Figure 10:
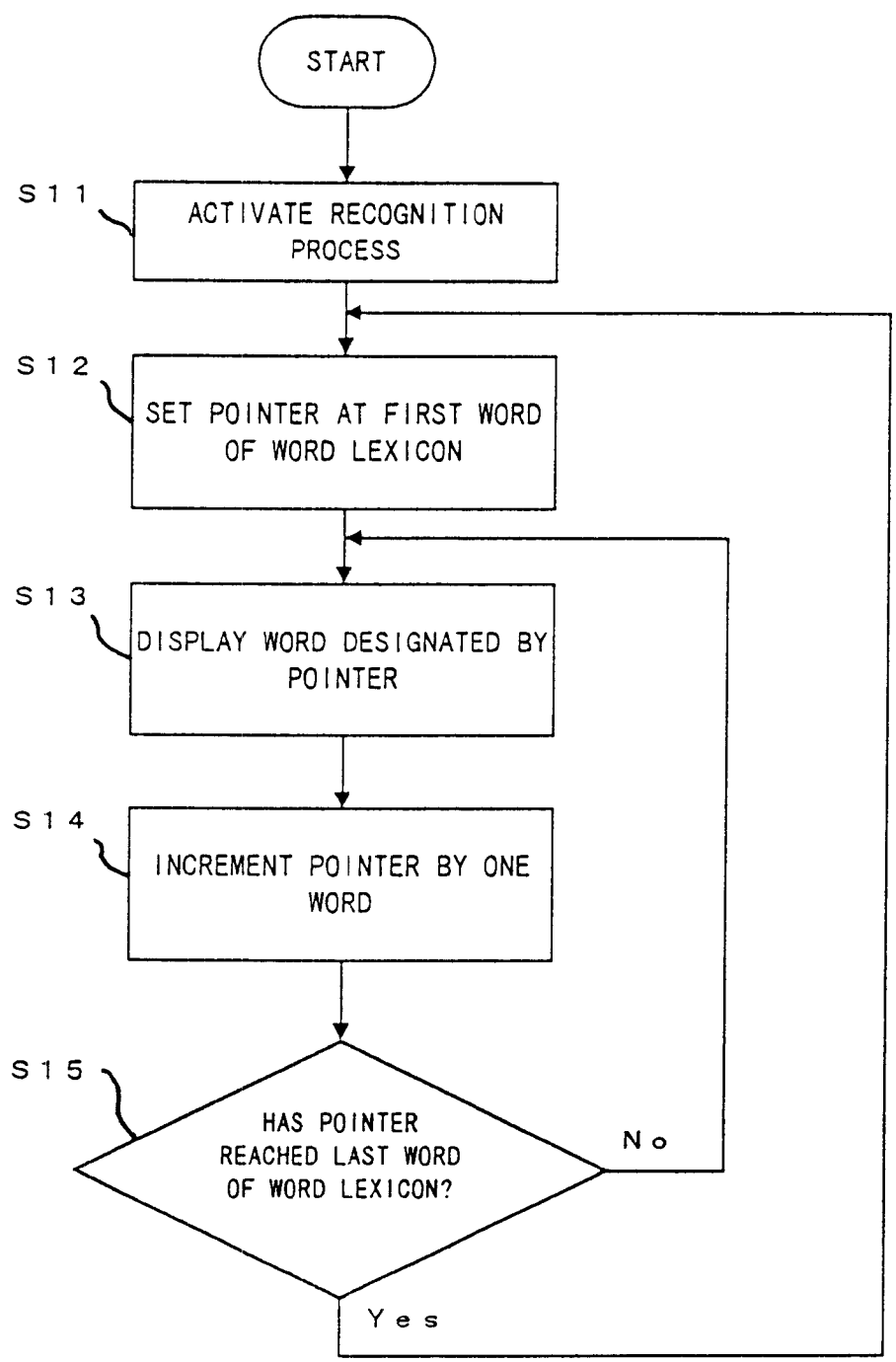
FIG. 10 is a flowchart showing a general process in the second aspect of performance.

FIG. 10 is a flowchart showing a general process in the second aspect of performance. Referring to the figure, when the general process is started, a recognition process is activated at step S11. Since the processing of the recognition process is the same as in FIG. 5, it shall be omitted from description.

Subsequently, at step S12, a pointer is set so as to point to the first word of the word lexicon 4. Then, the word designated by the pointer is displayed at step S13. In a case where the words are read out in units of a single word, the pointer is incremented by one word at step S14. In case of reading out the words in units of two words, the pointer is incremented by two words, and in case of reading out the words in units of three words, the pointer is incremented by three words. Step S15 functions to decide whether or not the pointer has reached the last of the words stored in the word lexicon 4. On condition that the last word has not been reached yet, the processing at step S13, and after, is iterated. Subject to the decision that the last word stored in the word lexicon 4 has been reached, the pointer is brought back to the first word of the word lexicon 4 at step S12, whereupon the processing at step S13 and after is iterated.

Figure 11:
FIG. 11 is a diagram for explaining a display image for the readout of a single word in the second aspect of performance.

FIG. 11 is a diagram for explaining a display image in the case where the words being subjects for recognition are successively read out in single-word units in the second aspect of performance. As illustrated in the figure, the names of the stations of the Yamanote Loop Line are read out and displayed one by one every clock pulse.

Figure 12:
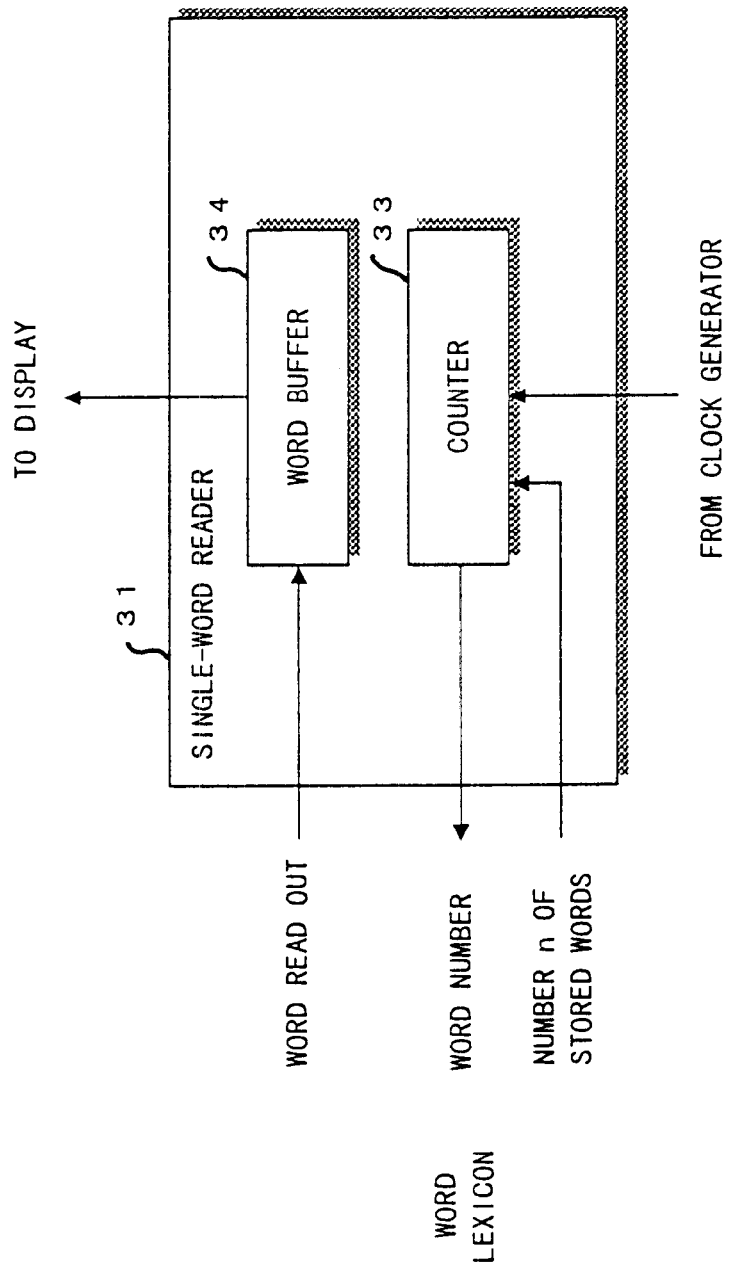
FIG. 12 is a block diagram showing the circuit arrangement of a single-word reader which is included in the system architecture of FIG. 9.

FIG. 12 is a block diagram showing the circuit arrangement of the single-word reader 31 depicted in FIG. 9. Referring to FIG. 12, the single-word reader 31 includes a counter 33 by which the number of the word to be read out is designated, and a word buffer 34 in which the word read out of the word lexicon 4 is temporarily stored and from which this word is delivered to the display device 6. The counter 33 is supplied with the clock signal for incrementing its count value, and the number n of words stored in the word lexicon 4. The count value of the counter 33 is incremented in synchronism with the clock signal, and it is automatically reset when the number n has been reached.

The scroll controller 21 in FIG. 3, or the single-word reader 31 in FIG. 9 may well be replaced with a repagination portion. In this case, by way of example, the number of words which can be displayed at one time by the display device 6 is set as each page, and the next page is displayed in accordance with the signal generated by the clock generator 22.

Further, the recognitive subject words as candidates, one of which may possibly be given as the voice input, are displayed in units of several words, so that the words of the candidates can be displayed even in a small display area, and the user can readily enter the voice input while watching these words of the candidates.

Still further, the recognitive subject words as candidates, one of which may possibly be given as the voice input, are displayed every page so that the user can readily enter the voice input while watching the large number of words of the candidates at one time.

Figure 13:
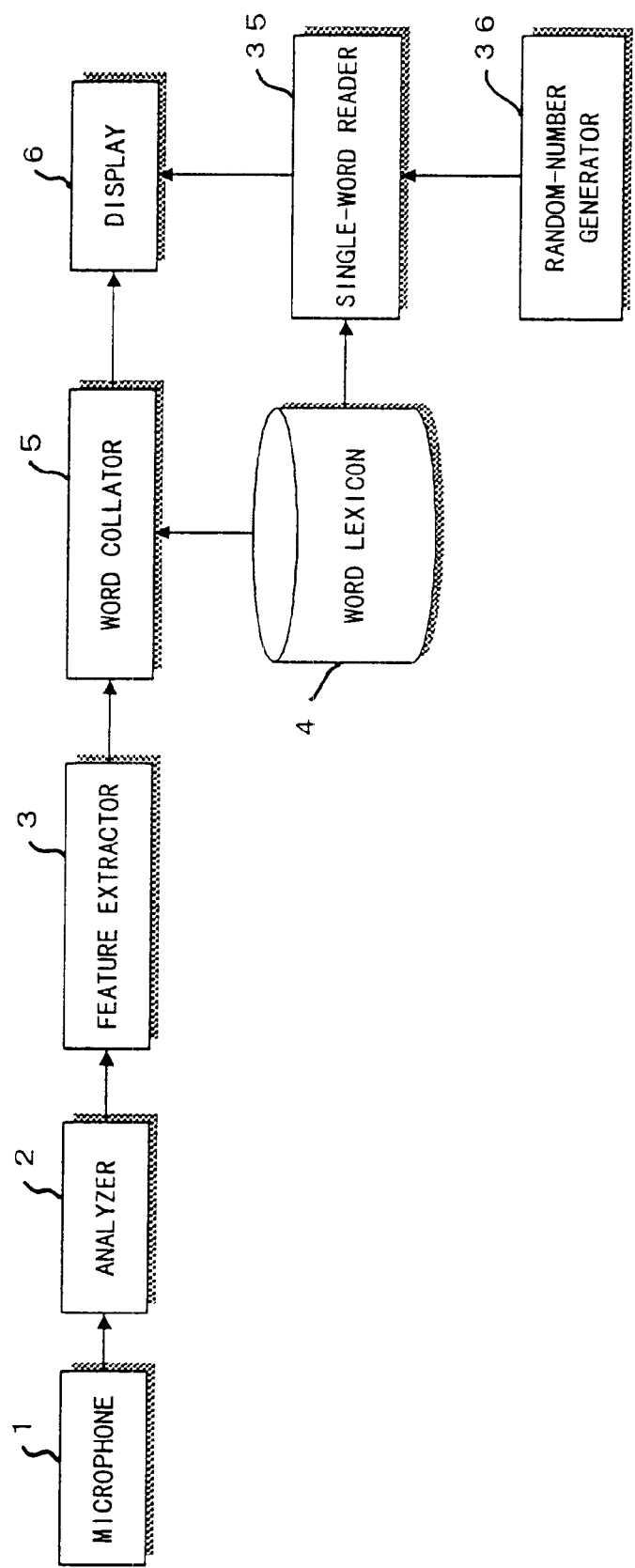
FIG. 13 is a block diagram showing an architecture in the third aspect of performance of a speech recognition system.

FIG. 13 is a block diagram showing an architecture in the third aspect of performance of a speech recognition system. As compared with the second aspect of performance illustrated in FIG. 9, the third aspect of performance illustrated in FIG. 13 differs in the point that a random-number generator 36 is included instead of the clock generator 22. A single-word reader 35 reads out words having word numbers of the values of random numbers generated by the random-number generator 36, in single-word units from the word lexicon 4. Each of such words is displayed by the display device 6.

Figure 14:
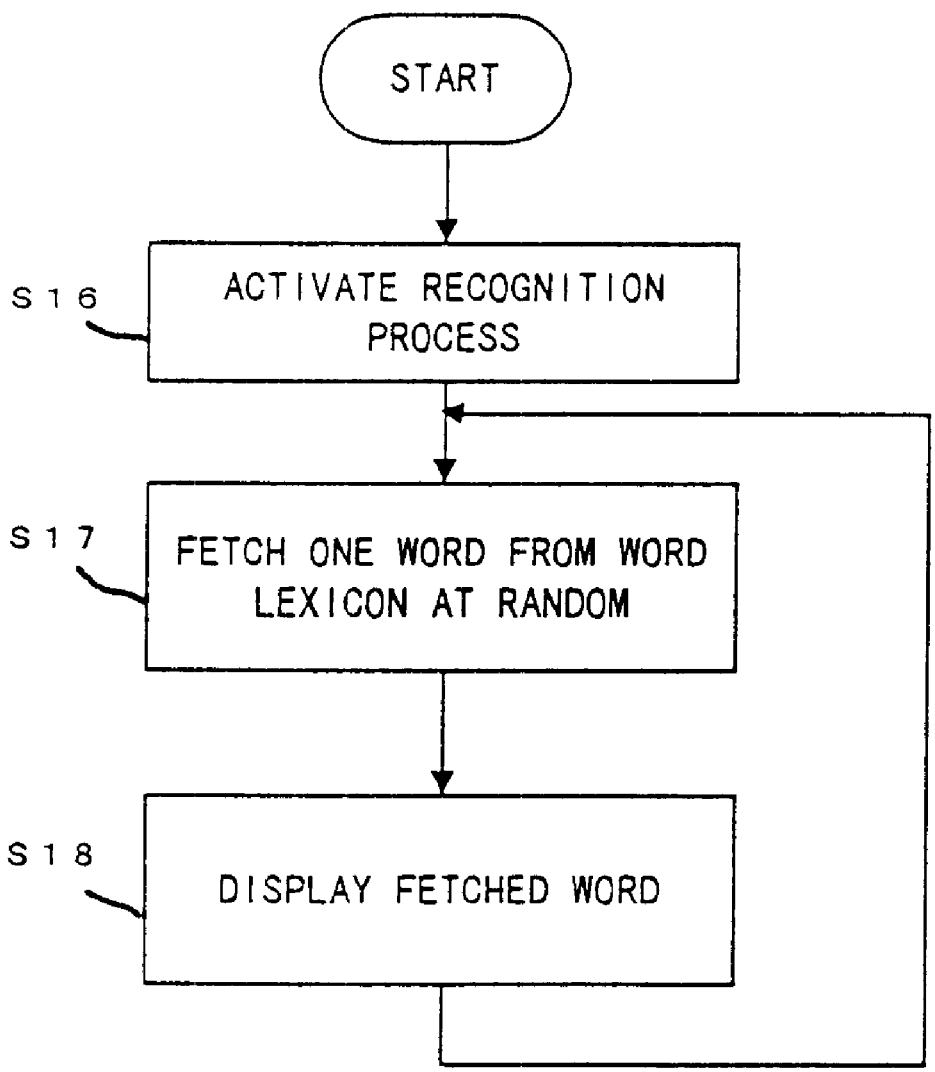
FIG. 14 is a flowchart showing a general process in the third aspect of performance.

FIG. 14 is a flowchart showing a general process in the third aspect of performance illustrated in FIG. 13. Referring to the figure, when the general process is started, a recognition process is activated at step S16. Since processing based on the recognition process is the same as in FIG. 5, it shall be omitted from description. Subsequently, at step S17, one of the words being subjects for recognition is randomly fetched from the word lexicon 4 on the basis of the random number outputted by the random-number generator 36. At step S18, the fetched word is displayed. Thenceforth, the processing at steps S17 and S18 is iterated.

Figure 15:
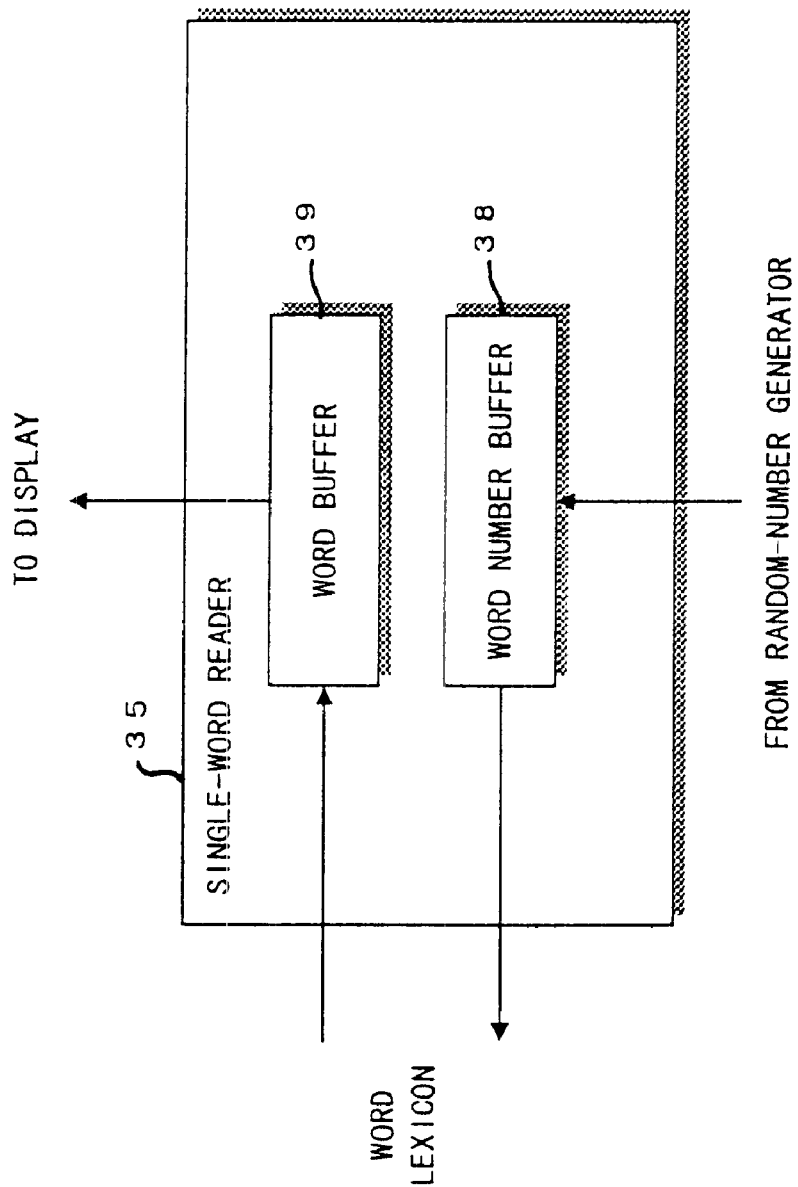
FIG. 15 is a block diagram showing the circuit arrangement of a single-word reader which is included in the system architecture of FIG. 13.

FIG. 15 is a block diagram showing the circuit arrangement of the single-word reader 35 depicted in FIG. 13. Referring to FIG. 15, the single-word reader 35 includes a word number buffer 38 by which the number of the word to be read out is given to the word lexicon 4, and a word buffer 39 which serves to temporarily store therein the word read out of the word lexicon 4 and to deliver the read-out word to the display device 6. Herein, the random number outputted by the random-number generator 36 is stored in the word number buffer 38. Besides, the recognitive subject word having the word number designated by the stored random number is read out of the word lexicon 4, and it is displayed by the display device 6 through the word buffer 39.

Still further, the recognitive subject words as candidates, one of which may possibly be given as the voice input, are read out randomly on the basis of random numbers in units of several words irrespective of the order of these words within a lexicon in which similar words are often stored in regular order, so that the user can readily enter the voice input while watching the displayed words of the candidates.

Figure 16:
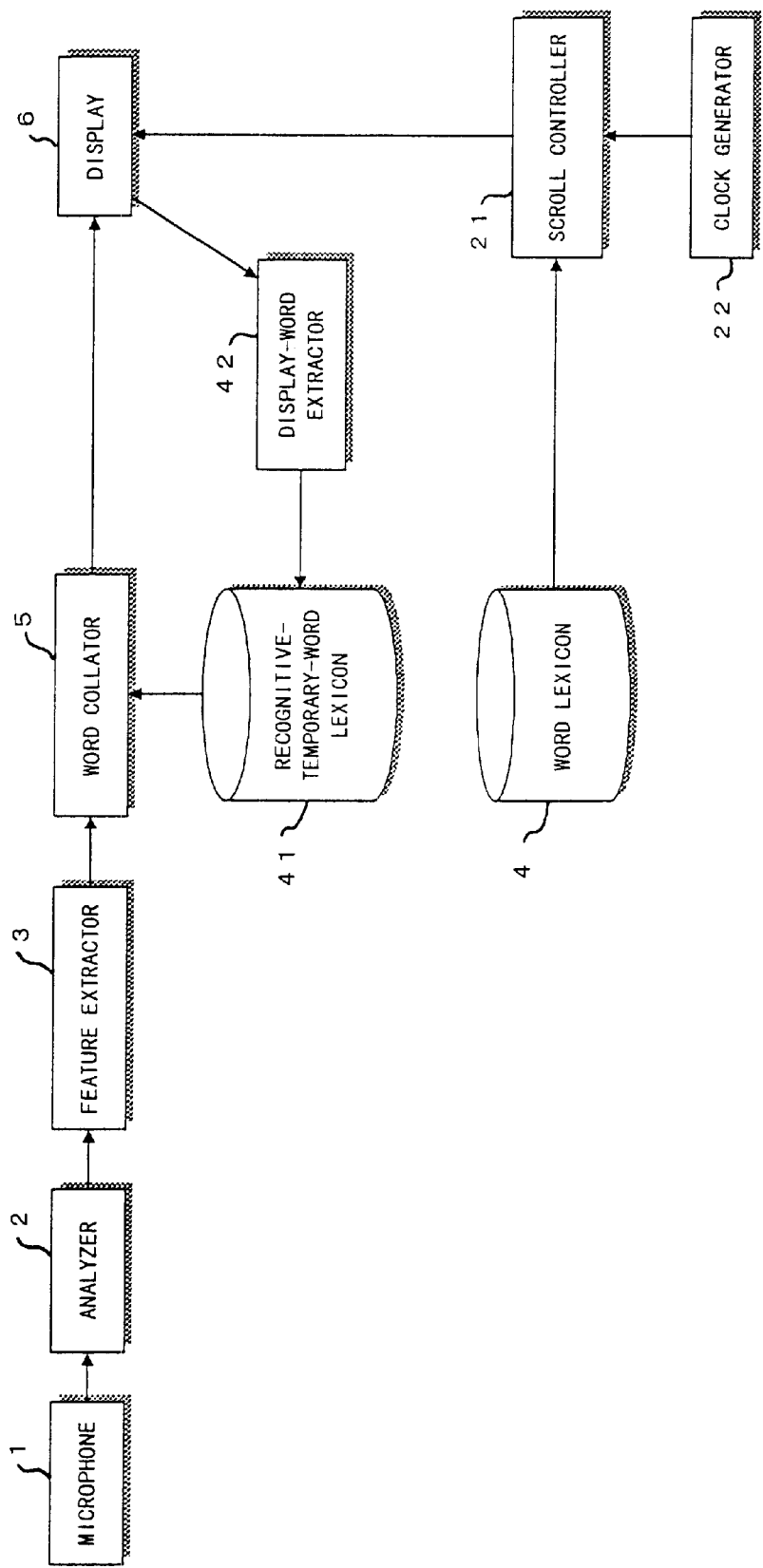
FIG. 16 is a block diagram showing an architecture in the fourth aspect of performance of a speech recognition system.

FIG. 16 is a block diagram showing an architecture in the fourth aspect of performance of a speech recognition system. As compared with the first aspect of performance illustrated in FIG. 3, the fourth aspect of performance illustrated in FIG. 16 differs in the points that a recognitive-temporary-word lexicon 41 and a display-word extractor 42 are added to the constituents shown in FIG. 3, and that the stored contents of the word lexicon 4 are afforded only to the scroll controller 21. Here in the fourth aspect of performance, recognitive subject words (namely, reference words being subjects for recognition) for use in the word collator 5 are not all the words stored in the word lexicon 4, but they are limited only to words stored in the recognitive-temporary-word lexicon 41. The recognitive words stored in the recognitive-temporary-word lexicon 41 are words extracted by the display-word extractor 42.

Although the operation of the display-word extractor 42 will be further explained later, this extractor 42 extracts the words displayed recently or latest by the display device 6 and then stores them as the recognitive words in the recognitive-temporary-word lexicon 41. The words which are displayed by the display device 6 consist of the output of the word collator 5, namely, a word being a recognized result, and one or more of the words stored in the word lexicon 4 as is/are controlled to scroll by the scroll controller 21. On the other hand, the recognitive words which are extracted by the display-word extractor 42 do not contain the output of the word collator 5, namely, the word being the recognized result.

As stated before, the speech recognition system toward which the present invention is directed is premised on such a case where the user does not know the subject or reference words for speech recognition well. As to, for example, the speech recognition system for inputting commands, the user is not very familiar with the names of the commands. The user finds a specified command to be inputted by him/her, from among the commands displayed by the display device 6, and he/she enters the found command as a voice input.

In such a case, the commands to be inputted by the user are not of a very large number of sorts, and the commands recently displayed by the display device 6 are often inputted again. It is therefore permitted to raise the speed of the recognition and to reduce the errors of the recognition, by taking the above measure that the words which are stored in the recognitive-temporary-word lexicon 41 and which are used as the subjects for the speech recognition by the word collator 5.

In general, in the speech recognition, it is required that every inputted voice be correctly recognized. Therefore, as the number of words being subjects for recognition grows, a longer time is expended on the collation which is executed by the word collator 5. Moreover, the correct recognition becomes difficult on account of the characteristics of microphones, peculiarities in the voices of individual persons, etc., and the errors of the recognition might develop. Here in the fourth aspect of performance, the recognitive subject words in the word collator 5 are limited to the words recently displayed by the display device 6, whereby a time period required for the recognition can be shortened, and the errors of the recognition can be reduced.

Figure 17:
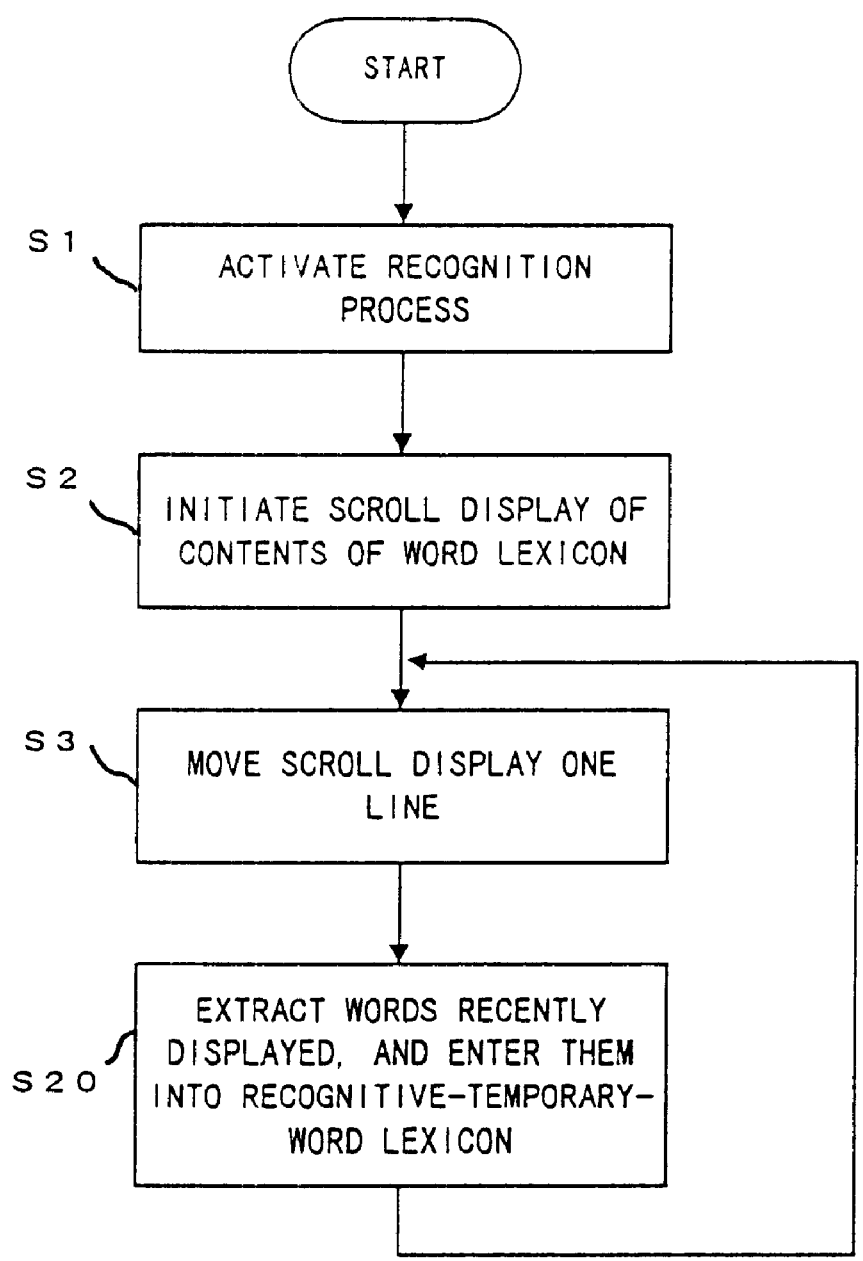
FIG. 17 is a flowchart showing a general process in the fourth aspect of performance.
Figure 18:
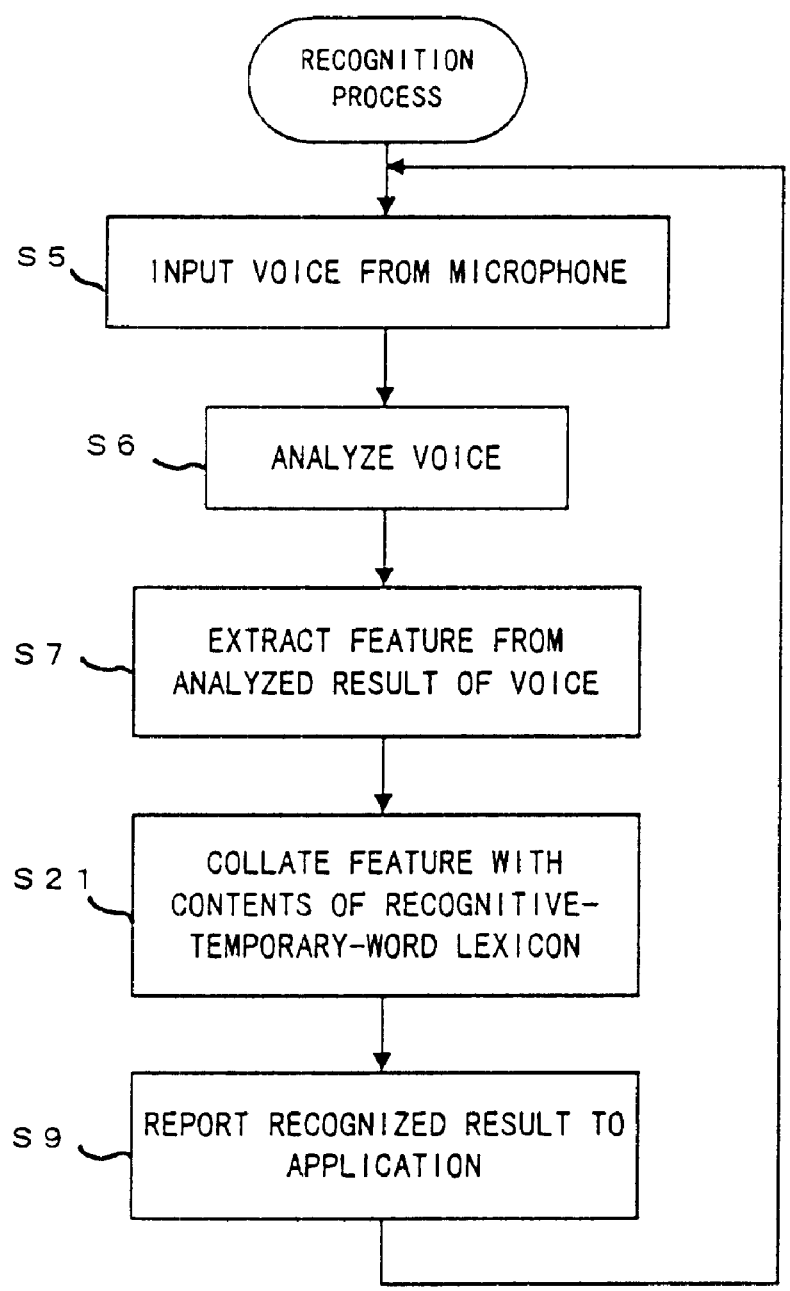
FIG. 18 is a processing flowchart showing a recognition process in the fourth aspect of performance.

FIG. 17 is a flowchart showing a general process in the fourth aspect of performance, while FIG. 18 is a flowchart showing processing based on a recognition process. As compared with the general process of the first aspect of performance illustrated in FIG. 4, the general process illustrated in FIG. 17 differs in the point of the addition of step S20 for the processing of extracting the word or words recently displayed and then storing the extracted word or words in the recognitive-temporary-word lexicon 41, after the scroll of one line at step S3.

As compared with the recognition process in FIG. 5 corresponding to the first, the second and the third aspects of performance, the recognition process in FIG. 18 differs in the point that step S8 at which the feature of the input voice is collated with all the words stored in the word lexicon 4 is replaced with step S21 at which the feature is collated with the words stored in the recognitive-temporary-word lexicon 41.

Figure 19:
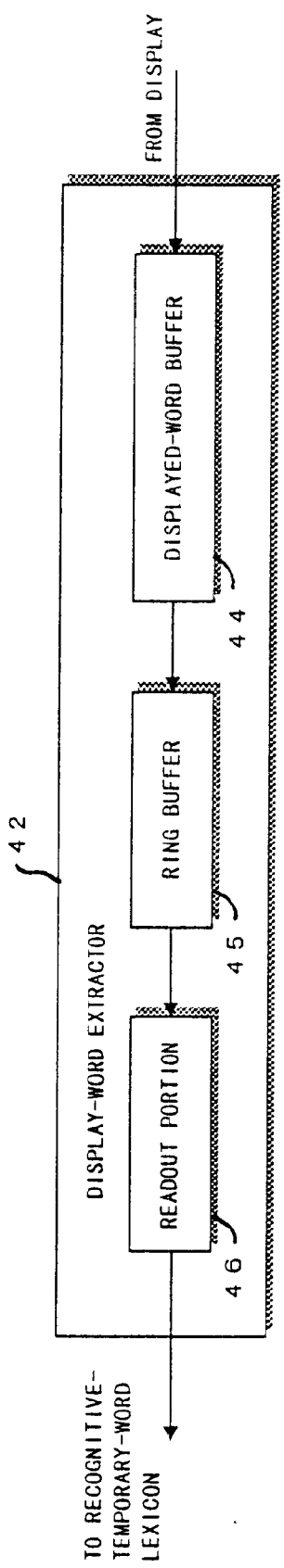
FIG. 19 is a block diagram showing the circuit arrangement of a display-word extractor which is included in the system architecture of FIG. 16.
Figure 20:
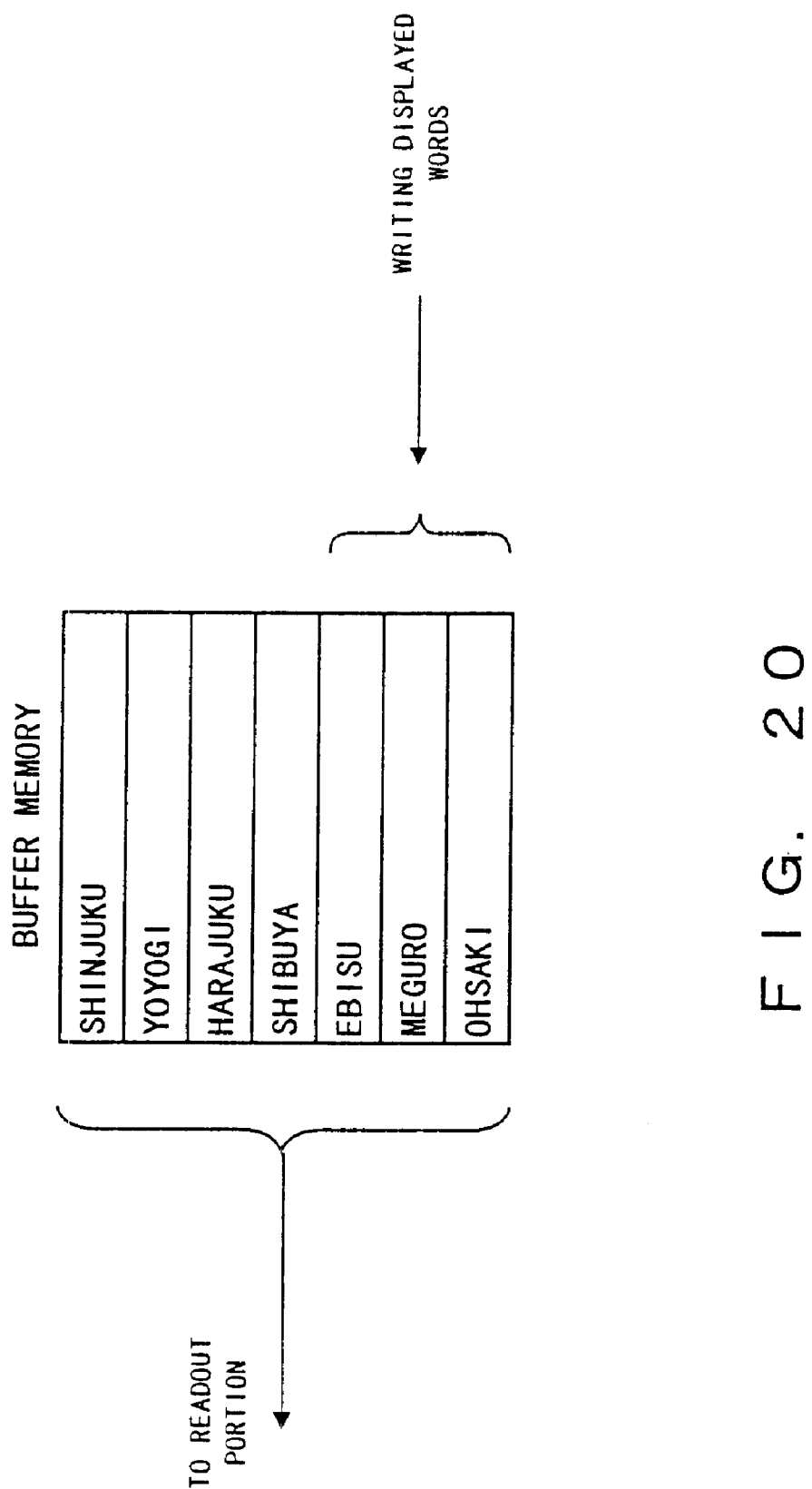
FIG. 20 is a diagram for explaining the processing contents of a ring buffer depicted in FIG. 19.

FIG. 19 is a block diagram showing the circuit arrangement of the display-word extractor 42 depicted in FIG. 16. Besides, FIG. 20 is a diagram for explaining the processing contents of a ring buffer 45 included in the display-word extractor 42. Referring to FIG. 19, the display-word extractor 42 includes a displayed-word buffer 44 in which the word displayed on the display device 6 is stored, the ring buffer 45 in which the outputs of the displayed-word buffer 44 are stored, and a readout portion 46 which reads out the contents of the ring buffer 45 and then delivers the read-out contents to the recognitive-temporary-word lexicon 41.

Referring to FIG. 20, the names of the stations of the Yamanote Loop Line in the number of 7 are stored in the buffer memory of the ring buffer 45 by way of example. The word which is currently displayed on the display device 6 and stored in the displayed-word buffer 44 shown in FIG. 19, is written in such a form that the oldest data is overwritten within the buffer memory. In due course, the words stored in the buffer memory, here the names of the seven stations, are afforded to the recognitive-temporary-word lexicon 41 through the readout portion 46.

Furthermore, the recognitive subject words, confined to the words having recently become such, these recognitive subject words being candidates one of which may more possibly be given as the voice input, are displayed as scrolling, so that the user can readily enter the voice input while watching the words of the candidates without moving the line of sight considerably, and the speed of recognition is increased.

Figure 21:
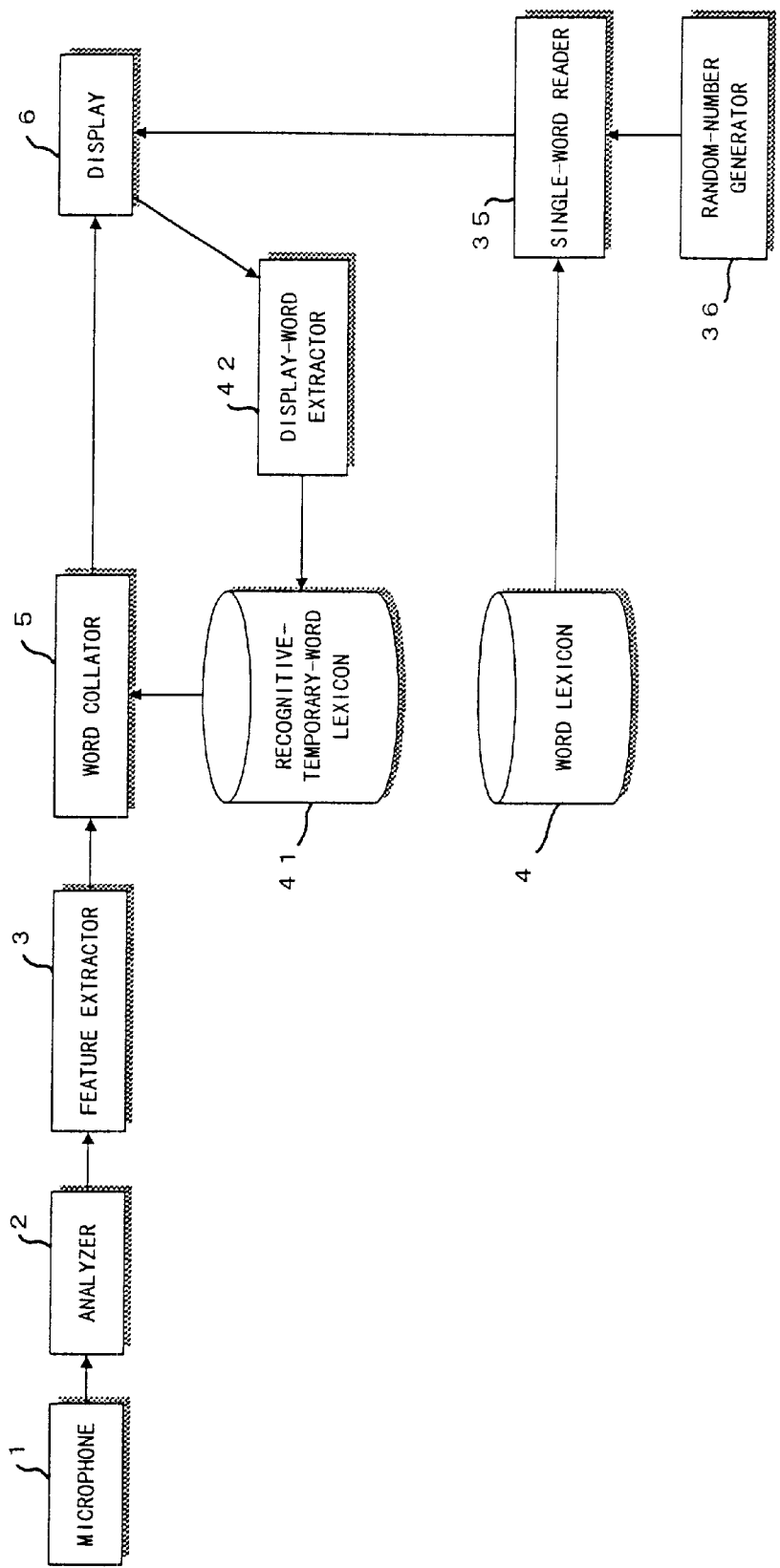
FIG. 21 is a block diagram showing an architecture in the fifth aspect of performance of a speech recognition system.

FIG. 21 is a block diagram showing an architecture in the fifth aspect of performance of a speech recognition system. As compared with the fourth aspect of performance illustrated in FIG. 16, the fifth aspect of performance illustrated in FIG. 21 differs in the point that a single-word reader 35 and a random-number generator 36 are included instead of the scroll controller 21 and the clock generator 22. The operations of the single-word reader 35 and random-number generator 36 are the same as in the third aspect of performance illustrated in FIG. 13. The operation of the fifth aspect of performance differs from that of the fourth aspect of performance, only in the point that the words stored in the word lexicon 4 are read out in single-word units by the single-word reader 35, on the basis of the word numbers correspondent to the random numbers generated by the random-number generator 36, and that the read-out words are displayed by the display device 6. By the way, it is naturally possible that the random-number generator 36 be replaced with the clock generator 22, and that the single-word reader 35 read out the words one by one in accordance with the clock signal generated by the clock generator 22.

Further, a repagination portion may well be installed instead of the single-word reader 35, besides the replacement of the random-number generator 36 with the clock generator 22.

In addition, the recognitive subject words, confined to the words having recently become such, these recognitive subject words being candidates one of which may more possibly be given as the voice input, are read out randomly on the basis of random numbers in units of several words irrespective of the order of these words within a lexicon in which similar words are often stored in regular order, so that the user can readily enter the voice input while watching the legible words of the candidates, and the speed of recognition is increased.

Moreover, the recognitive subject words, confined to the words having recently become such, these recognitive subject words being candidates one of which may more possibly be given as the voice input, are displayed in units of several words, so that the words of the candidates can be displayed even in a small display area, that the user can readily enter the voice input while watching these words of the candidates, and the speed of recognition is increased.

Still further, the recognitive subject words, confined to the words having recently become such, these recognitive subject words being candidates one of which may more possibly be given as the voice input, are displayed every page, so that the user can readily enter the voice input while watching the large number of words of the candidates at one time, and the speed of recognition is increased.

What is claimed is:

1. A speech recognition system for recognizing an inputted voice command of a user, comprising:
   a recognitive word storage unit to store recognitive subject words which are subjects for the recognition of the inputted voice command;
   a display unit to automatically display and scroll the words stored in said recognitive word storage unit subject to recognition, before the user first inputs a voice command, such that the user finds a word to be entered with the input voice command without entering a computer mouse input;
   an input unit to input a voice command of a user; and
   a speech recognition unit to recognize a word which is most similar to said inputted voice command from among recently displayed words from the recognitive subject words stored in said recognitive-word storage unit, on the basis of a feature of said inputted voice command, so as to deliver the recognized word as a recognized result.

2. A speech recognition system as defined in claim 1, wherein said display unit displays said recognitive subject words stored in said recognitive word storage unit, while automatically scrolling said words on a display screen thereof.

3. A speech recognition system as defined in claim 2, wherein said display unit determines timings of the scroll on the basis of a clock signal.

4. A speech recognition system as defined in claim 1, wherein said display unit displays said recognitive subject words stored in said recognitive word storage unit, while automatically repaginating said words on a display screen thereof.

5. A speech recognition system as defined in claim 4, wherein said display means determines timings of the repagination on the basis of a clock signal.

6. A speech recognition system as defined in claim 1, wherein said display unit reads out said recognitive subject words stored in said recognitive word storage unit, successively in units of at least one word, so as to automatically display said at least one word on a display screen thereof.

7. A speech recognition system as defined in claim 6, wherein said display unit determines timings of the successive readout on the basis of a clock signal.

8. A speech recognition system as defined in claim 1, wherein said display unit reads out said recognitive subject words stored in said recognitive word storage unit, in units of at least one word on the basis of values of random numbers which correspond to numbers assigned to said words, so as to automatically display said at least one word on a display screen thereof.

9. A speech recognition system for recognizing an inputted voice command, comprising:
   a recognitive word storage unit to store words which are subjects for the recognition of the currently inputted voice command;
   a word storage unit to store recognitive subject words which are subjects for the recognition by the recognition system;

a display unit to automatically display and scroll the words stored in said word storage unit before a user first speaks the voice command, in order to assist the user of said speech recognition system in entering the voice command;

an input unit to input a voice command of a user;

a speech recognition unit to recognize a word which is the most similar to said inputted voice command from among recently displayed words stored in said recognitive word storage unit, on the basis of a feature of said inputted voice command, so as to deliver the recognized word as a recognized result; and a display-word extraction unit to extract words recently displayed by said display unit, and to store the extracted words in said recognitive word storage unit.

10. A speech recognition system as defined in claim 9, wherein said display unit displays said recognitive subject words stored in said recognitive word storage unit, while automatically scrolling said words on a display screen thereof.

11. A speech recognition system as defined in claim 10, wherein said display unit determines timings of the scroll on the basis of a clock signal.

12. A speech recognition system as defined in claim 9, wherein said display unit displays said recognitive subject words stored in said recognitive word storage unit, while automatically repaginating said words on a display screen thereof.

13. A speech recognition system as defined in claim 12, wherein said display unit determines timings of the repagination on the basis of a clock signal.

14. A speech recognition system as defined in claim 9, wherein said display unit reads out said recognitive subject words stored in said recognitive word storage unit, successively in units of at least one word, so as to automatically display said at least one word on a display screen thereof.

15. A speech recognition system as defined in claim 14, wherein said display unit determines timings of the successive readout on the basis of a clock signal.

16. A speech recognition system as defined in claim 9, wherein said display unit reads out said recognitive subject words stored in said recognitive word storage unit, in units of at least one word on the basis of values of random numbers which correspond to numbers assigned to said words, so as to automatically display said at least one word on a display screen thereof.

17. A computer-readable storage medium storing therein a program for causing a computer to perform:

automatically displaying and scrolling words stored in a recognitive-word storage unit subject to recognition, before a user first inputs the voice command, such that a user finds a word to be entered with the input voice command without entering a computer mouse input; and obtaining a word which is most similar to the inputted voice command from among recently displayed words that are stored in the recognitive-word storage unit, on the basis of a feature of the inputted voice so as to deliver a most similar word as a recognized result.

18. A computer-readable storage medium storing therein a program for causing a computer to execute, comprising:

automatically displaying and scrolling words stored in a word storage unit storing the words which may possibly become subjects for recognition of an input voice command, before a user first speaks the inputted voice command, such that a user finds a word to be entered with a voice input without entering a computer mouse input;

extracting words recently displayed among the words which have been automatically displayed up to the present, as the words to become said recognitive subject words, so as to store the extracted words in the recognitive-word storage unit; and obtaining a word which is most similar to an inputted voice command from among the extracted words stored in a recognitive word storage unit storing the recognitive subject words for the recognition of the currently inputted voice command, on the basis of a feature of said inputted voice command, so as to deliver a most similar word as a recognized result.

19. A method for displaying a recognitive-subject, in a speech recognition system for recognizing an inputted voice command, comprising:

storing words which are subjects for recognition by the speech recognition system;

automatically displaying and scrolling said stored words before a user first speaks the voice command, such that the user finds a word to be entered with the voice command without entering a computer mouse input;

inputting the voice command of a user; and obtaining a word which is most similar to said inputted voice command from among recently displayed word from the stored recognitive subject words, on the basis of a feature of said inputted voice command, so as to deliver a most similar word as a recognized result.

20. A method for displaying a recognitive-subject, in a speech recognition system for recognizing an inputted voice, comprising:

automatically displaying and scrolling, before a user first speaks the voice command, words stored in a word storage unit storing the words which may possibly become subjects for recognition of input voice commands, such that a user finds a word to be entered with an input voice command without entering a computer mouse input;

inputting the voice command of the user;

obtaining a word which is most similar to an inputted voice command from among recently displayed words from the recognitive subject words being subjects for recognition of the currently inputted voice command, on the basis of a feature of said inputted voice command, so as to deliver a most similar word as a recognized result; and extracting words recently displayed among words which have been displayed up to the present by said displaying step, as the words to become the recognitive subject words, so as to store the extracted words in a recognitive-word storage unit.

21. A speech recognition system, comprising:

a storage unit to store recognizable words;

a display unit to automatically display and scroll, before a user first speaks a voice command word, at least one of the recognizable words in a predetermined sequence on a display prior to an audible input of the voice command word to a speech recognition unit; and a input unit to input the voice command of a user, wherein said speech recognition unit recognizes the inputted voice command word by selecting at least one of the recognized words from among the recently displayed words from said storage unit which is most similar to the inputted voice command word such that the user finds a word to be entered with the voice command word without entering a computer mouse input.

22. A speech recognition system for recognizing an inputted voice command, comprising:
- a recognitive word storage unit to store recognitive subject words which are subjects for the recognition of the inputted voice command;
- a display unit to automatically scroll the words stored in said recognitive word storage unit across a display, before a user speaks the inputted voice command, on the basis of a clock signal;
- an input unit to input the voice command of a user; and
- a speech recognition unit to recognize a word which is most similar to said inputted voice command from among recently displayed words stored in said recognitive-word storage unit, on the basis of a feature of said inputted voice command, so as to deliver the recognized word as a recognized result.

23. A speech recognition system for recognizing an inputted voice command, comprising:
- a recognitive word storage unit to store recognitive subject words which are subjects for the recognition of the inputted voice command;
- a display unit reads out said recognitive subject words stored in said recognitive word storage unit, in units of at least one word on the basis of values of random numbers which correspond to numbers assigned to said words, to automatically display and scroll said at least one word on a display, before a user first inputs the voice command;
- an input unit to input the voice command of the user; and
- a speech recognition unit to recognize a word which is most similar to said inputted voice command from among recently displayed subject words stored in said recognitive-word storage unit, on the basis of a feature of said inputted voice, so as to deliver the recognized word as a recognized result.

24. A speech recognition system that recognizes an audible input as a recognized word, comprising:
- a display unit to sequentially display and scroll a plurality of stored recognizable words, before a user first speaks the audible input, such that each word is displayed without displaying other words of the plurality;
- an input unit to input the audible input of a user; and
- a selection unit to select a recently displayed word as a recognized word based on the audible input.

* * * * *